United States Patent
Sze et al.

(10) Patent No.: US 11,076,155 B2
(45) Date of Patent: Jul. 27, 2021

(54) REDUCING CONTEXT CODED AND BYPASS CODED BINS TO IMPROVE CONTEXT ADAPTIVE BINARY ARITHMETIC CODING (CABAC) THROUGHPUT

(71) Applicant: Texas Instruments Incorporated, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/015,155

(22) Filed: Sep. 9, 2020

(65) Prior Publication Data

US 2020/0404277 A1 Dec. 24, 2020

Related U.S. Application Data

(60) Continuation of application No. 16/437,277, filed on Jun. 11, 2019, now Pat. No. 10,798,384, which is a
(Continued)

(51) Int. Cl.
*H04N 19/00* (2014.01)
*H04N 19/13* (2014.01)
(Continued)

(52) U.S. Cl.
CPC ......... *H04N 19/13* (2014.11); *H04N 19/124* (2014.11); *H04N 19/60* (2014.11); *H04N 19/70* (2014.11); *H04N 19/91* (2014.11); *H04N 19/184* (2014.11)

(58) Field of Classification Search
CPC ...... H04N 19/13; H04N 19/124; H04N 19/60; H04N 19/70; H04N 19/91; H04N 19/184
See application file for complete search history.

(56) References Cited

U.S. PATENT DOCUMENTS

| 2008/0276078 A1* | 11/2008 | Hu | H04N 19/176 |
| | | | 712/223 |
| 2009/0074057 A1* | 3/2009 | Marpe | H04N 19/13 |
| | | | 375/240.02 |

(Continued)

FOREIGN PATENT DOCUMENTS

| WO | WO 2011127403 | 10/2011 |
| WO | WO 2012172113 | 12/2012 |
| WO | WO 2013106987 | 7/2013 |

OTHER PUBLICATIONS

Detlev Marpe et al, "Context-Based Adaptive Binary Arithmetic Coding in the H.264/AVC Video Compression Standard", IEEE Transactions on Circuits and Systems for Video Technology, pp. 620-636, vol. 13, No. 7, Jul. 2003.
(Continued)

*Primary Examiner* — Zhihan Zhou
(74) *Attorney, Agent, or Firm* — Ebby Abraham; Charles A. Brill; Frank D. Cimino

(57) ABSTRACT

Techniques for context-adaptive binary arithmetic coding (CABAC) coding with a reduced number of context coded and/or bypass coded bins are provided. Rather than using only truncated unary binarization for the syntax element representing the delta quantization parameter and context coding all of the resulting bins as in the prior art, a different binarization is used and only part of the resulting bins are context coded, thus reducing the worst case number of context coded bins for this syntax element. Further, binarization techniques for the syntax element representing the remaining actual value of a transform coefficient are provided that restrict the maximum codeword length of this syntax element to 32 bits or less, thus reducing the number of bypass coded bins for this syntax element over the prior art.

12 Claims, 7 Drawing Sheets

Related U.S. Application Data division of application No. 15/431,532, filed on Feb. 13, 2017, now Pat. No. 10,321,131, which is a division of application No. 13/862,458, filed on Apr. 14, 2013, now Pat. No. 9,584,802.

(60) Provisional application No. 61/623,778, filed on Apr. 13, 2012, provisional application No. 61/650,023, filed on May 22, 2012, provisional application No. 61/641,997, filed on May 3, 2012, provisional application No. 61/659,205, filed on Jun. 13, 2012.

(51) Int. Cl.
*H04N 19/91* (2014.01)
*H04N 19/124* (2014.01)
*H04N 19/60* (2014.01)
*H04N 19/70* (2014.01)
*H04N 19/184* (2014.01)

(56) References Cited

U.S. PATENT DOCUMENTS

| | | | | |
|---|---|---|---|---|
| 2009/0096643 | A1* | 4/2009 | Chang | H04N 19/426 341/51 |
| 2010/0127904 | A1* | 5/2010 | Oxman | H03M 7/4006 341/107 |
| 2010/0238056 | A1* | 9/2010 | Seki | H04N 19/149 341/107 |
| 2012/0195368 | A1* | 8/2012 | Chien | H04N 19/895 375/240.02 |
| 2013/0027230 | A1* | 1/2013 | Marpe | H04N 19/436 341/107 |
| 2013/0028334 | A1* | 1/2013 | Bossen | H03M 7/4018 375/240.25 |
| 2013/0114693 | A1* | 5/2013 | Gao | H04N 19/176 375/240.03 |
| 2013/0272377 | A1* | 10/2013 | Karczewicz | H04N 19/463 375/240.02 |
| 2014/0140400 | A1* | 5/2014 | George | H03M 7/42 375/240.12 |
| 2014/0192861 | A1* | 7/2014 | Chuang | H04N 19/21 375/240.02 |

OTHER PUBLICATIONS

"Advanced Video Coding for Generic Audiovisual Services", Series H: Audiovisual and Multimedia Systems, ITU-T Recommendation H.264, Telecommunication Standardization Sector of International Communication Union, pp. 1-324, Mar. 2005.

Thomas Wiegand et al., "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

Benjamin Bross et al, "WD4: Working Draft 4 of High-Efficiency Video Coding", JCTVC-F803_d6, Joint collaborative Team on Video Coding (JCT-VC) of ITU-T SG16 WP3 and ISO/IEC JTC1/SC29/WG11, pp. 1-214, Jul. 14-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Vivienne Sze, "Reduction in Context Coded Bins for ref_idx and cu_qp_delta", JCTVC-I0204, Joint Collaborative Team on Video Coding (JCT-VC) of ITU-T SG16 WP3 and ISO/IEC JTC1/SC29/WG11, pp. 1-6, Apr. 27-May 7, 2012, Geneva, Switzerland.

Benjamin Bross et al, "High Efficiency Video Coding (HEVC) Text Specification Draft 7", JCTVC-I1003_d0, Joint Collaborative Team on Video Coding (JCT-VC) of ITU-T SG16 WP3 and ISO/IEC JTC1/SC29/WG11, pp. 1-256, Apr. 27-May 7, 2012, Geneva, Switzerland.

Vivienne Sze et al, "Bin Reduction for Delta QP Coding", JCTVC-J0089, Joint Collaborative Team on Video Coding (JCT-VC) of ITU-T SG16 WP3 and ISO/IEC JTC1/SC29/WG11, pp. 1-7, Jul. 11-20, 2012, Stockholm, Sweden.

Vivienne Sze et al, "Bin Reduction for Delta QP Coding", JCTVC-J0089 Presentation, Joint Collaborative Team on Video Coding (JCT-VC) of ITU-T SG16 WP3 and ISO/IEC JTC1/SC29/WG11, pp. 1-4, Jul. 11-20, 2012, Stockholm, Sweden.

Vadim Seregin et al, "AHG5: Bypass Bins for Reference Index Coding", JCTVC-J0098, Joint Collaborative Team on Video Coding (JCT-VC) of ITU-T SG16 WP3 and ISO/IEC JTC1/SC29/WG11, pp. 1-5, Jul. 11-20, 2012, Stockholm, Sweden.

Madhukar Budagavi and Vivienne Sze, "coeff_abs_level_remaining Maximum Codeword Length Reduction", JCTVC-J0142, Joint Collaborative Team on Video Coding (JCT-VC) of ITU-T SG16 WP3 and ISO/IEC JTC1/SC29/WG11, pp. 1-14, Jul. 11-20, 2012, Stockholm, Sweden.

Madhukar Budagavi and Vivienne Sze, "coeff_abs_level_remaining Maximum Codeword Length Reduction", JCTVC-J0142 Presentation, Joint Collaborative Team on Video Coding (JCT-VC) of ITU-T SG16 WP3 and ISO/IEC JTC1/SC29/WG11, pp. 1-14, Jul. 11-20, 2012, Stockholm, Sweden.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-249, Jul. 11-20, 2012, Stockholm, Sweden.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

"TMS320DM6467 Digital Media System-on-Chip", SPRS403G, Texas Instruments Incorporated, Dec. 2007, revised Oct. 2010, pp. 1-355.

Vadim Seregin et al, "Bypass Bins for Reference Index and delta QP Coding", JCTVC-I0594, Joint Collaborative Team on Video Coding (JCT-VC) of ITU-T SG16 WP3 and ISO/IEC JTC1/SC29/WG11, pp. 1-6, Apr. 27-May 7, 2012, Geneva, Switzerland.

\* cited by examiner

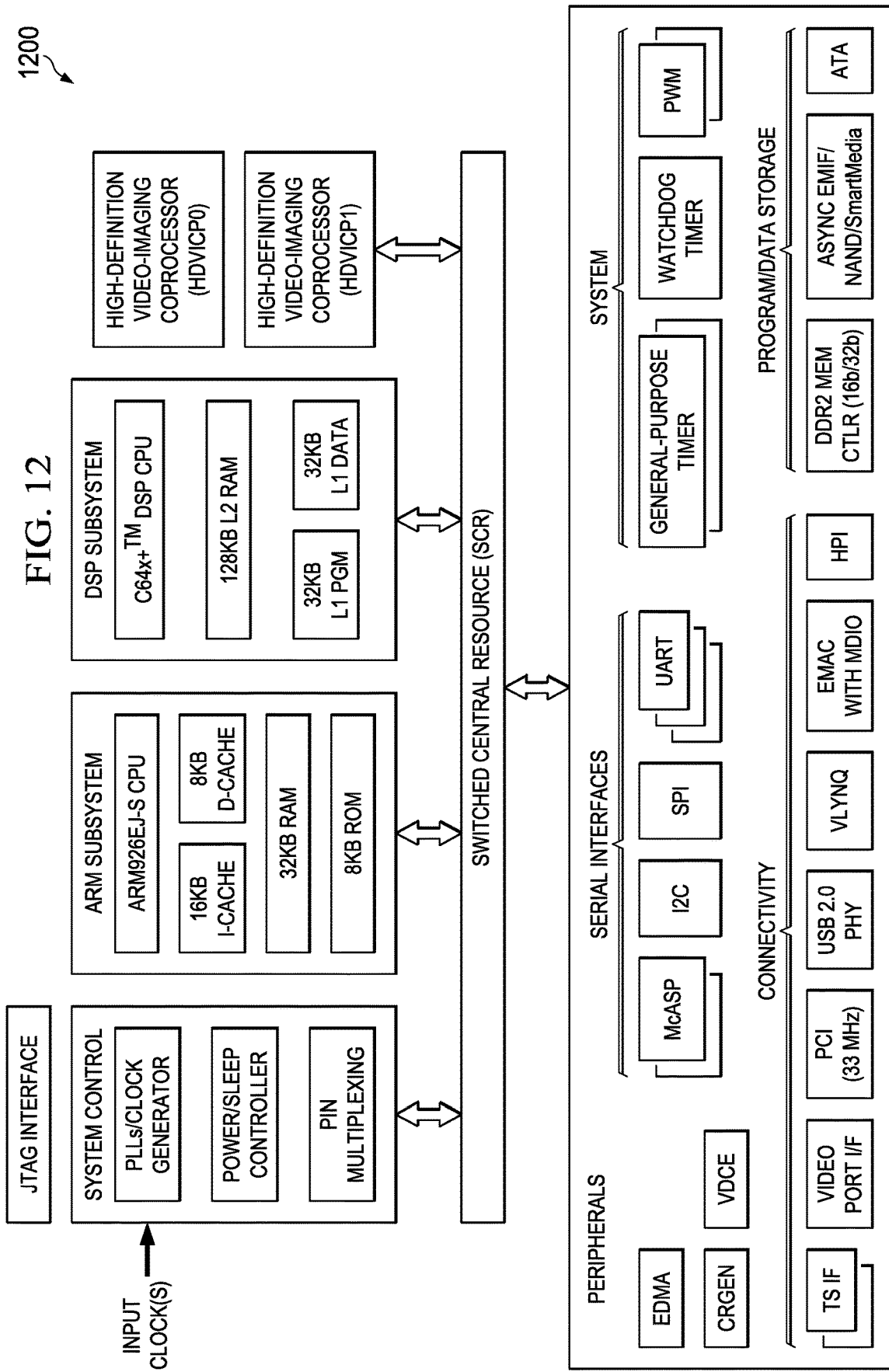

REDUCING CONTEXT CODED AND BYPASS CODED BINS TO IMPROVE CONTEXT ADAPTIVE BINARY ARITHMETIC CODING (CABAC) THROUGHPUT

CROSS-REFERENCE TO RELATED APPLICATIONS

This application is a continuation of U.S. patent application Ser. No. 16/437,277, filed Jun. 11, 2019, which is a division of application Ser. No. 15/431,532, filed Feb. 13, 2017 (now U.S. Pat. No. 10,321,131), which is a division of application Ser. No. 13/862,458, filed Apr. 14, 2013 (now U.S. Pat. No. 9,584,802), which claims the benefit of U.S. Provisional Patent Application Ser. No. 61/623,778, filed Apr. 13, 2012, U.S. Provisional Patent Application Ser. No. 61/641,997, filed May 3, 2012, U.S. Provisional Patent Application Ser. No. 61/650,023, filed May 22, 2012, and U.S. Provisional Patent Application Ser. No. 61/659,205, filed Jun. 13, 2012, all of which are incorporated herein by reference in their entirety.

BACKGROUND OF THE INVENTION

Field of the Invention

Embodiments of the present invention generally relate to context adaptive binary arithmetic coding (CABAC) of syntax elements in video coding.

Description of the Related Art

Video compression, i.e., video coding, is an essential enabler for digital video products as it enables the storage and transmission of digital video. In general, video compression techniques apply prediction, transformation, quantization, and entropy coding to sequential blocks of pixels in a video sequence to compress, i.e., encode, the video sequence. Video decompression techniques generally perform the inverse of these operations in reverse order to decompress, i.e., decode, a compressed video sequence.

Context-adaptive binary arithmetic coding (CABAC) is a form of entropy coding used in video encoding. CABAC is an inherently lossless compression technique notable for providing considerably better compression than most other encoding algorithms used in video encoding at the cost of increased complexity. In brief, CABAC has multiple probability modes for different contexts. It first converts all non-binary symbols to binary symbols referred to as bins. Then, for each bin, the coder selects which probability model to use, and uses information from nearby elements to optimize the probability estimate. Arithmetic coding is then applied to compress the data. The theory and operation of CABAC coding for H.264/AVC is defined in the International Telecommunication Union, Telecommunication Standardization Sector (ITU-T) standard "Advanced video coding for generic audiovisual services" H.264, revision 03/2005 or later, which is incorporated by reference herein. General principles are explained in "Context-Based Adaptive Binary Arithmetic Coding in the H.264/AVC Video Compression Standard," Detlev Marpe, July 2003, which is incorporated by reference herein.

CABAC is a well known throughput bottleneck in video codec implementations (particularly on the decoder side) primarily due to data dependencies in context selection which make CABAC difficult to parallelize. In CABAC, bins can be either context coded or bypass coded. Bypass coded bins do not require context selection which allows these bins to be processed at a much high throughput than context coded bins. Thus, to improve the throughput of the CABAC, the number of context coded bins should be reduced. However, it is also desirable to reduce the number of bypass coded bins as the number of bypass coded bins are an order of magnitude larger than the number of context coded bins. In general, encoder and decoder hardware is designed for the worst case. Thus, it is important to reduce the worst case number of both context and bypass coded bins.

SUMMARY

Embodiments of the present invention relate to methods, apparatus, and computer readable media for context adaptive binary arithmetic coding (CABAC) of certain syntax elements. In one aspect, a method for encoding a video sequence in a video encoder to generate a compressed video bit stream is provided that includes determining a value of a delta quantization parameter syntax element, binarizing the value to generate a sequence of bins, wherein the sequence includes a prefix and a suffix, context coding the bins of the prefix into the compressed video bit stream, and bypass coding the bins of the suffix into the compressed video bit stream.

In one aspect, a method for decoding a compressed video bit stream in a video decoder is provided that includes context decoding a first sequence of bins from the compressed video bit stream, the first sequence of bins corresponding to a prefix of a binarized value of a delta quantization parameter syntax element, debinarizing the first sequence of bins to determine a value of the prefix, bypass decoding a second sequence of bins from the compressed video bit stream, the first sequence of bins corresponding to a suffix of the binarized value of the delta quantization parameter syntax element, debinarizing the second sequence of bins to determine a value of the suffix, and adding the prefix and the suffix to determine a value of the delta quantization parameter syntax element.

In one aspect, a method for encoding a video sequence in a video encoder to generate a compressed video bit stream is provided that includes determining a value of a syntax element for a remaining actual value of a transform coefficient, binarizing the value using a variable length code (VLC) to generate a sequence of bins, wherein a maximum codeword length of the VLC is 32 bits or less, and bypass coding the sequence of bins into the compressed video bit stream.

In one aspect, a method for decoding a compressed video bit stream in a video decoder is provided that includes bypass decoding a sequence of bins from the compressed video bit stream, the sequence of bins comprising a prefix and a suffix of a binarized value of a syntax element for a remaining actual value of a transform coefficient, and debinarizing the sequence of bins using a variable length code (VLC) to determine a value of the syntax element, wherein a maximum codeword length of the VLC is 32 bits or less.

BRIEF DESCRIPTION OF THE DRAWINGS

Particular embodiments will now be described, by way of example only, and with reference to the accompanying drawings:

FIG. 12 is a block diagram of an illustrative digital system.

DETAILED DESCRIPTION OF EMBODIMENTS OF THE INVENTION

Figure 1A:
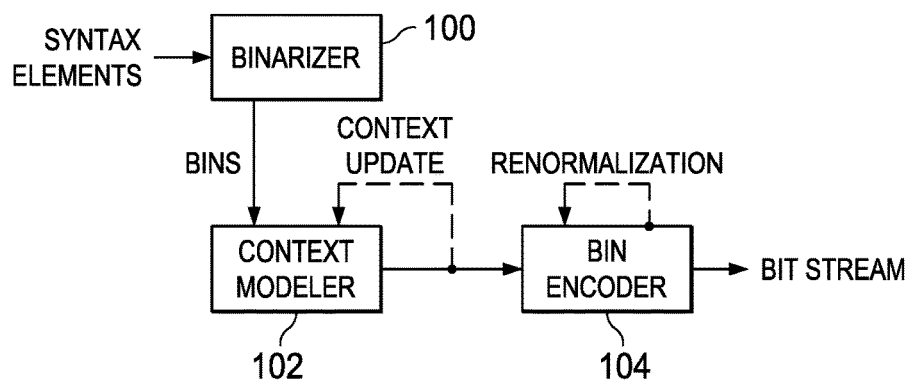
FIGS. 1A and 1B are block diagrams illustrating CABAC encoding and decoding.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% improvement in coding efficiency over the current standard, H.264/AVC, as well as larger resolutions and higher frame rates. For convenience of description, some embodiments of the invention are described herein in reference to HEVC and use terminology from HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units for a coding unit. A transform unit may not be larger than a coding unit. In recent specifications, the size of a square transform unit may be 4×4, 8×8, 16×16, and 32×32 and the size of a non-square transform may be 16×4, 4×16, 32×8, and 8×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), and B. Bross, et al., "High Efficiency Video Coding (HEVC) Text Specification Draft 9," JCTVC-K1003_v7, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"). Each of these documents describes CABAC coding.

Some aspects of this disclosure have been presented to the JCT-VC in V. Sze and M. Budagavi, "Reduction in Context Coded Bins for ref_idx and cu_qp_delta", JCTVC-I0204, Joint Collaborative Team on Video Coding (JCT-VC) of ITU-T SG16 WP3 and ISO/IEC JTC1/SC29/WG11, Geneva, Switzerland, Apr. 27-May 12, 2012, V. Sze, et al., "Bin Reduction for Delta QP Coding", JCTVC-J0089, Joint Collaborative Team on Video Coding (JCT-VC) of ITU-T SG16 WP3 and ISO/IEC JTC1/SC29/WG11, Stockholm, Sweden, Jul. 11-20, 2012, V. Seregin, et al., "AHG5: Bypass Bins for Reference Index Coding", JCTVC-J0098, Joint Collaborative Team on Video Coding (JCT-VC) of ITU-T SG16 WP3 and ISO/IEC JTC1/SC29/WG11, Stockholm, Sweden, Jul. 11-20, 2012, and M. Budagavi and V. Sze, "coeff_abs_level_remaining Maximum Codeword Length Reduction", JCTVC-J0142, Joint Collaborative Team on Video Coding (JCT-VC) of ITU-T SG16 WP3 and ISO/IEC JTC1/SC29/WG11, Stockholm, Sweden, Jul. 11-20, 2012, which are incorporated by reference herein in their entirety.

Figure 1B:
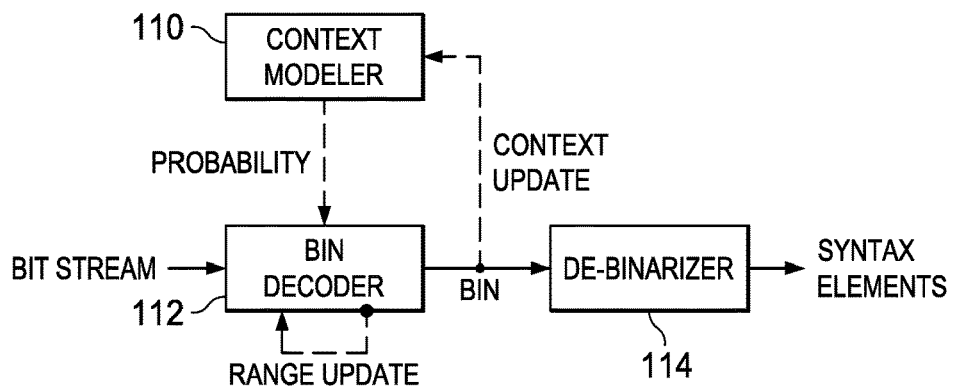

Context-adaptive binary arithmetic coding (CABAC) is used to encode/decode syntax elements in the emerging HEVC standard. FIGS. 1A and 1B are block diagrams illustrating the three key components of, respectively, CABAC encoding and CABAC decoding. Referring now to FIG. 1A, a CABAC encoder includes a binarizer 100, a context modeler 102, and a bin encoder 104. The binarizer 100 converts syntax elements into strings of one or more binary symbols referred to as bins. In general, a syntax element is an element of data produced by the video encoding process. For example, a syntax element may be a motion vector difference, a prediction mode, a coefficient level, a flag, a reference index, etc. The syntax elements are defined by the video coding standard, e.g., HEVC.

The binarization of a syntax element is also defined by the video coding standard, i.e., the standard dictates the content of the binary symbol string for each syntax element. That is, the coding standard defines a binarization scheme with unique mappings of syntax elements to sequences of bins. Examples of binarization include unary coding, truncated unary coding, exp-Golomb coding, and fixed length coding. Further, as part of binarization, a bin index (binIdx) is generated which indicates the location of the bin within the syntax element; the bin index in conjunction with the context selection logic indicates whether a bin may be classified as a regular (context-coded) bin or an equal probability (bypass-coded) bin. Whether a particular bin is to be classified as context-coded or a bypass-coded is also defined by the video coding standard. Context and bypass bins are explained in more detail below. A bin that is classified as context-coded is referred to as a context bin herein and a bin that is classified as bypass-coded is referred as a bypass bin herein.

The context modeler 102 selects a context model for a context bin. The video coding standard defines the available context models, the initial values of the context models, and which context model(s) should be used for bins of each syntax element. A context model includes a state value and a binary value of the most probable symbol MPS. The context models are updated throughout the coding process to track the probability estimations. That is, a bin is encoded based on the current state of the context model selected by the context modeler 102, and the context model is then updated to reflect the state transition and the MPS after the bin is coded. This updating corresponds to the feedback loop labeled "context update" in FIG. 1A.

The bin encoder 104 performs binary arithmetic coding of a bin using the context model (probability) selected by the context modeler 102. Binary arithmetic coding is based on the principle of recursive interval subdivision of an interval of width R. The current interval for each recursion, i.e., the internal state of the arithmetic coding, is represented by its lower bound L and its width (range) R. For each bin to be encoded, the current interval is subdivided into two subintervals, an interval of width $R_{LPS}=R*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. Depending on whether the bin is the LPS or MPS, the corresponding subinterval is selected as the interval for the next bin.

The lower bound L and the range R are updated according to the lower bound and range of the selected subinterval. A renormalization process is then executed to rescale the lower bound L and the range R if needed. The renormalization process iteratively scales the range R to a minimum value of 256 with successive left shifts by 1 and may take from zero to 8 iterations depending on the value of the range R. In each iteration, the lower bound L is also scaled and a single output bit is generated to be added to the encoded bit stream. The polarity of the output bit is determined by the value of the lower bound L at each iteration. However, in certain cases, the polarity of an output bit may need to be resolved in subsequent iterations or in renormalization after coding one or more subsequent bins, i.e., carry propagation may occur. Such bits are referred to as outstanding bits. A count is kept of these outstanding bits and they are output when a future output bit resolves them to a known value. Thus, 0 to 8 output bits may be generated during renormalization plus any outstanding bits may also be output. The renormalization process corresponds to the feedback loop labeled "renormalization" in FIG. 1A.

The CABAC decoding process is the inverse of the encoding process and has similar feedback loops. Referring now to FIG. 1B, a CABAC decoder includes a bin decoder 112, a context modeler 110, and a de-binarizer 114. The context modeler 110 selects a context model for the next context bin to be decoded. As in the encoder, the context models are updated throughout the decoding process to track the probability estimations. That is, a bin is decoded based on the current state of the context model selected by the context modeler 110, and the context model is then updated to reflect the state transition and the MPS after the bin is decoded. This updating corresponds to the feedback loop labeled "context update" in FIG. 1B.

The bin decoder 112 performs binary arithmetic decoding of a bin using the context model selected by the context modeler 110. Binary arithmetic decoding, like binary arithmetic encoding, is based on the principle of recursive interval subdivision of an interval of width (range) R. The internal state of the arithmetic decoding for each recursion is represented by the range R and an offset O used to select the correct subinterval for a bin. A decoded bin is output at each recursion.

To decode a bin, the current interval is subdivided into two subintervals, an interval of width $R_{LPS}=R*p_{LPS}$ and an interval of width $R_{MPS}=R-R_{LPS}$, where $p_{LPS}$ is an estimate of the probability of the least probable symbol (LPS), and MPS is the most probable symbol, with a probability of $1-p_{LPS}$. The value of $p_{LPS}$ is determined using the state value of the context model. If the offset falls in the subinterval $R_{LPS}$, the bin is decoded as the LPS and the subinterval is selected as the interval for decoding the next bin; otherwise, the bin is decoded as the MPS and $R_{MPS}$ is selected as the interval for decoding the next bin.

The range R is updated to be the selected subinterval. A renormalization process is then executed to rescale the range R and update the offset O if needed. The renormalization process iteratively scales the range R to a minimum value of 256 with successive left shifts by 1. The number of iterations needed depends on the value of the range R. In each iteration, the offset O is also left shifted by 1 and the next bit in the bit stream is shifted into the offset. The renormalization process corresponds to the feedback loop labeled "range update" in FIG. 1B.

The de-binarizer 114 receives the decoded bins and operates to reverse the binarization of the binarizer 100 to reconstruct syntax elements.

Figure 2A:
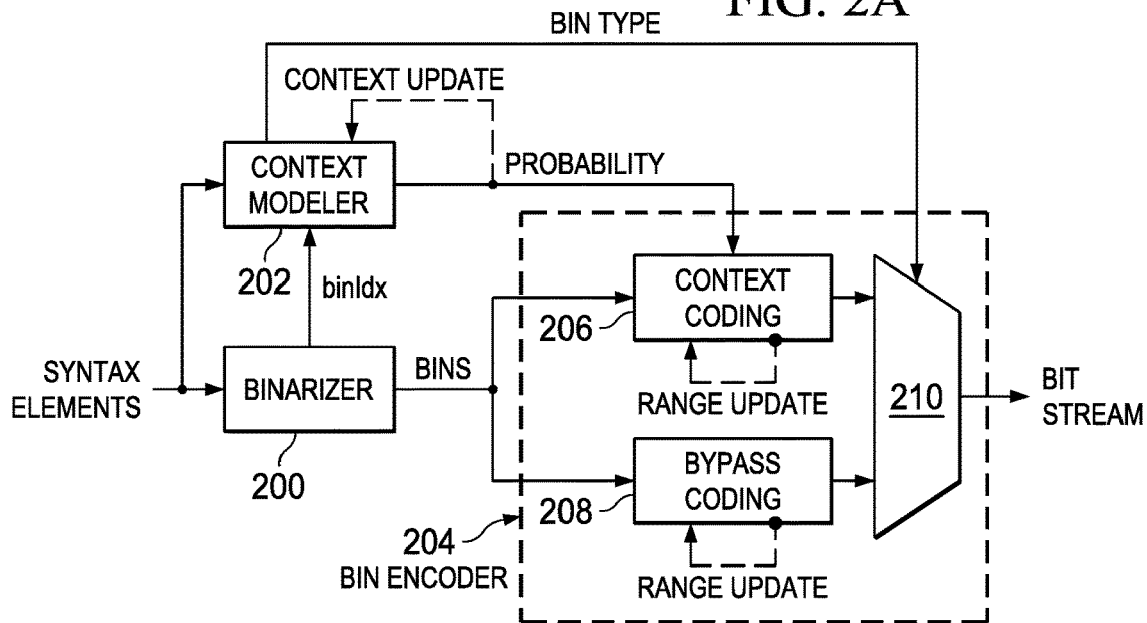
FIGS. 2A and 2B are block diagrams of, respectively, a CABAC encoder and a CABAC decoder providing both context coding mode and bypass coding mode.
Figure 2B:
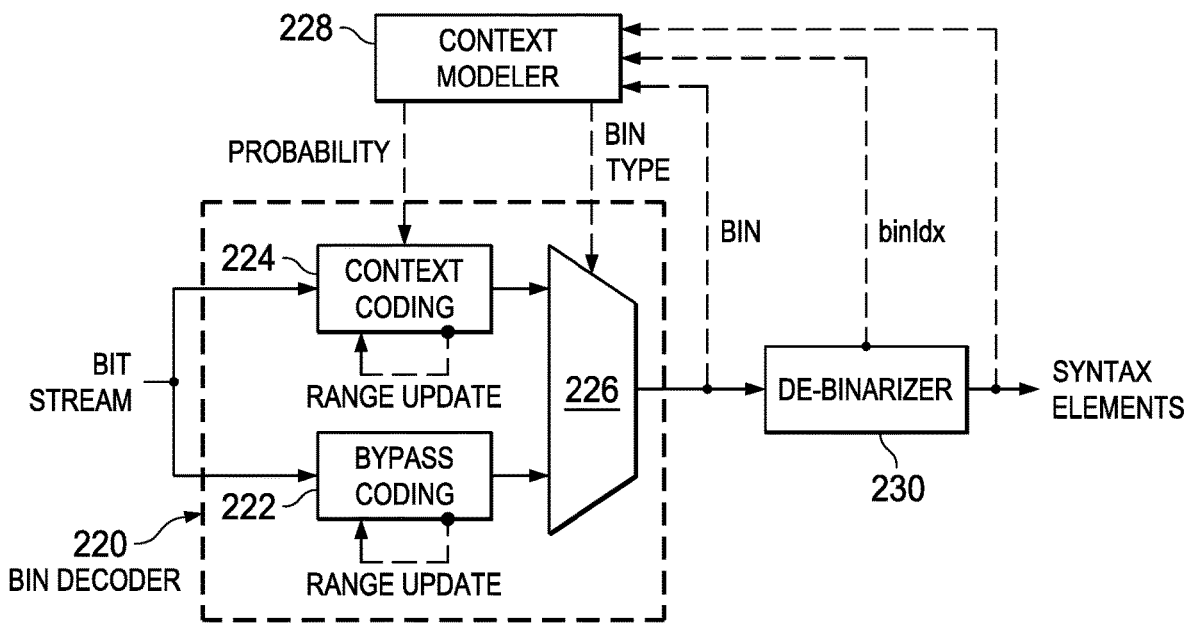

As was previously mentioned, a bin may be a context bin or a bypass bin. Thus, the bin encoder and the bin decoder can operate in two modes: context coding mode and bypass coding mode. FIGS. 2A and 2B are block diagrams of, respectively, a CABAC encoder with a bin encoder providing both modes and a CABAC decoder with a bin decoder providing both modes. In context coding mode, context bins are encoded/decoded according to the full context modeling process. This mode enables high coding efficiency but the throughput is limited due to the feedback loops. In bypass coding mode, the bypass bins have an assumed fixed probability of 0.5, which means that 0 and 1 occur in equal probability. In this mode, the context modeling is skipped and thus the feedback loop involved in the modeling. Thus several bypass coded bins can be coded in parallel. Furthermore, with the 0.5 probability, the range update in the arithmetic coding engine can be implemented with a simple shift, which reduces the delay in the range update loop. The reduced delay in the range update loop reduces the critical path of the arithmetic encoder/decoder allowing bypass bins to be processed at a higher throughput than context bins. However, the coding efficiency of bypass bins is lower than that of context bins.

Referring now to the CABAC encoder of FIG. 2A, the binarizer 200 converts syntax elements into strings of one or more binary symbols. The binarizer 200 directs each bin to either the context coding 206 or the bypass coding 208 of the bin encoder 204 based on a bin type determined by the context modeler 202. The binarizer also provides a bin index (binIdx) for each bin to the context modeler 202.

The context modeler 202 determines the bin type, i.e., context or bypass, for each bin. The order in which syntax elements should occur in the compressed video bit stream is known, so the type of each syntax element to be encoded can be determined prior to encoding based on the types of previously encoded syntax elements. Further, as previously mentioned, for each syntax element, the type (bypass or context) of each bin in the syntax element is known. Given the type of the syntax element being encoded and which bin in the syntax element is the next to be decoded, the context modeler 202 can determine whether a bin is a context bin or a bypass bin. The context modeler 202 provides the bin type to the multiplexor 210 and, although not specifically shown, to the binarizer 200.

If a bin is a context bin, the context modeler 202 also selects a context model for the bin to be used by the context coding 206. The context coding 206 operates as previously described to encode each context bin. The bypass coding 208 operates as previously described to encode each bypass bin. The bit values generated by the context coding 206 and bypass coding 208 are provided the multiplexer 210. The multiplexor 210 selects the output of the context coding 206 or the bypass coding 208 to be output into the compressed bit stream according to the bin type provided by the context modeler 202.

Referring now to the CABAC decoder of FIG. 2B, the bin decoder 220 receives the compressed video bit stream and directs the bit stream to the bypass coding 222 or the context coding 224 according to bin types determined by the context modeler 228.

The context modeler 228 determines the bin type for each bin to be decoded. As was previously explained, the order in which syntax elements should occur in the compressed video bit stream is known. Thus, the type of each syntax element to be decoded can be determined prior to decoding based on the types of previously decoded syntax elements. Further, for each syntax element, the type (bypass or context) of each bin in the syntax element is known. Given the type of the syntax element being decoded and which bin in the syntax element is the next to be decoded, the context modeler 228 can determine whether the next bin is a context bin or a bypass bin. The context modeler 228 provides the bin type to the multiplexor 226 and, although not specifically shown, to the bin decoder 220.

If a bin is a context bin, the context modeler 220 also selects a context model to be used by the context coding 224 to decode the bin. The context coding 224 operates as previously described to decode each context bin. The bypass coding 222 operates as previously described to decode each bypass bin. The bins generated by the context coding 224 and bypass coding 222 are provided the multiplexer 226. The multiplexer 226 selects the output of the context coding 224 or the bypass coding 222 to be provided to the de-binarizer 230 according to the bin type provided by the context modeler 228. The de-binarizer 230 receives decoded bins for a syntax element from the bin decoder 220 and operates to reverse the binarization of the encoder to reconstruct the syntax elements.

Truncated unary coding is used to binarize several syntax elements in HEVC. Unary coding of a syntax element involves signaling a bin string of length N+1, where the first N bins are 1 and the last bin is 0. The decoder searches for a 0 to determine when the syntax element is complete. Truncated unary coding of a syntax element generates one less bin that unary coding by setting a maximum on the largest possible value of the syntax element (cMax). When N+1<cMax, the signaling is the same as unary coding (first N bins are 1 and last bin is 0). However, if N+1>cMax, then all bins are 1. The decoder searches for a 0 up to cMax bins to determine when the syntax element is complete. An example of truncated unary coding where cMax=10 is shown in Table 1.

TABLE 1

| Value | Bin string |
|---|---|
| 0 | 0 |
| 1 | 10 |
| 2 | 110 |
| 3 | 1110 |
| 4 | 11110 |
| 5 | 111110 |
| 6 | 1111110 |
| 7 | 11111110 |
| 8 | 111111110 |
| 9 | 1111111110 |
| 10 | 1111111111 |

Truncated unary binarization is specified in HEVC Draft 6 for syntax elements such as the difference between a luma quantization parameter (qp) for a coding unit and the prediction of the parameter (referred to as cu_qp_delta in early versions of HEVC), reference picture indices (ref_idx_l0, ref_idx_l1, ref_idx_lc), etc. For these syntax elements, all bins are context coded. When cMax is a large value, the number of context coded bins can be prohibitively large. For example, for cu_qp_delta, cMax can have a value of 52, which means in the worst case, a maximum of 26 context coded bins are signaled per coding unit (CU). This translates to 104 context coded bins per LCU (assuming 4 CUs in an LCU). In another example, for the reference indices, cMax can have a value of 15. Thus, in the worst case, a maximum of 32 context coded bins are signaled per prediction unit (PU) since up to two reference indices can be signaled per PU. This translates to 240 context coded bins per LCU (assuming 8 PUs in an LCU). For the worst case, these two types of syntax elements account for over 30% of the context coded bins. It would be desirable to avoid using truncated unary coding of syntax elements where the value of cMax is large and the resulting bins are context coded.

In HEVC, the bins of some syntax elements are all bypass coded. Due to the particular binarization specified for some such syntax elements in HEVC Draft 7, the worst case number of bypass bins for a few of these syntax elements is quite large. For example, the level (value) of a non-zero transform coefficient is encoded as some combination of three level indicators (syntax elements) that indicate if the coefficient level is greater than 1 (coeff_abs_level_greater1_flag), greater than 2 (coeff_abs_level_greater2_flag), and the remaining actual value (coeff_abs_level_remaining). Bypass coding is specified for the bins of the syntax element coeff_abs_level_remaining and the binarization of this syntax element is specified as a variable length code (VLC) with a unary coded prefix and fixed length suffix, the size of which depends on the prefix and a parameter cParam that is adaptively updated after each coeff_abs_level_remaining syntax element is coded. The parameter cParam may range in value from 0 to 4, and controls the length of a fixed length suffix of the codewords. The value of cParam starts at 0 for each transform unit and may be increased in value when sufficiently large coefficient values occur in the transform unit. The particular coefficient values that may cause the value of cParam to be increased are defined in HEVC.

This VLC may be referred to as U-FLC123-L37 where the U denotes that the prefix is unary coded, FLC123 indicates that the length of the suffix increases by one each time the prefix length increases by one, and L37 indicates that the maximum codeword length is 37. In this VLC, values 0-8 are unary coded and for values above 8, the codeword is constructed as follows: the first eight bits have the value 1, the remainder of the codeword prefix and the codeword suffix are formed by EG(0) of ((coeff_abs-Level-remaining>>cParam)−8), and the fixed length suffix of cParam bits is formed by the binary value of coeff_abs-Level-remaining-((coeff_abs-Level-remaining>>cParam) *$2^{cParam}$). Table 2 shows this code for the case where cParam=0. Table 3 shows this code for the case where cParam=1. In Table 3, the character "c" indicates the fixed length portion of the suffix due to the value of cParam. Note that the worst case length for this syntax element in Table 2 is 37 bins and in table 3 is 36 bins, which would be encoded in the bit stream as, respectively, 37 bits and 36 bits. Bypass coded syntax elements of this length adversely affects CABAC decoding throughput and increases decoding complexity, especially for hardware architectures that use 32-bit processors and/or 32-bit memories.

TABLE 2

| Input Value | Prefix code (unary) | Prefix code length | Prefix CodeNum | Suffix code length | Total codeword length |
|---|---|---|---|---|---|
| 0 | 0 | 1 | 0 | 0 | 1 |
| 1 | 10 | 2 | 1 | 0 | 2 |
| 2 | 110 | 3 | 2 | 0 | 3 |
| 3 | 1110 | 4 | 3 | 0 | 4 |
| 4 | 11110 | 5 | 4 | 0 | 5 |
| 5 | 111110 | 6 | 5 | 0 | 6 |
| 6 | 1111110 | 7 | 6 | 0 | 7 |
| 7 | 11111110 | 8 | 7 | 0 | 8 |
| 8 | 111111110 | 9 | 8 | 0 | 9 |
| 9~10 | 1111111110 | 10 | 9 | 1 | 11 |
| 11~14 | 11111111110 | 11 | 10 | 2 | 13 |
| 15~22 | 111111111110 | 12 | 11 | 3 | 15 |
| 23~38 | 1111111111110 | 13 | 12 | 4 | 17 |
| 39~70 | 11111111111110 | 14 | 13 | 5 | 19 |
| 71~134 | 111111111111110 | 15 | 14 | 6 | 21 |
| 135~262 | 1111111111111110 | 16 | 15 | 7 | 23 |
| 263~518 | 11111111111111110 | 17 | 16 | 8 | 25 |
| 519~1030 | 111111111111111110 | 18 | 17 | 9 | 27 |
| 1031~2054 | 1111111111111111110 | 19 | 18 | 10 | 29 |
| 2055~4102 | 11111111111111111110 | 20 | 19 | 11 | 31 |
| 4103~8198 | 111111111111111111110 | 21 | 20 | 12 | 33 |
| 8199~16390 | 1111111111111111111110 | 22 | 21 | 13 | 35 |
| 16391~32774 | 11111111111111111111110 | 23 | 22 | 14 | 37 |

TABLE 3

| Input Value | Codeword prefix | Codeword suffix | Fixed length suffix | Prefix code length | Suffix code length | Total code length |
|---|---|---|---|---|---|---|
| 0~1 | 0 | | c | 1 | 1 | 2 |
| 2~3 | 10 | | c | 2 | 1 | 3 |
| 4~5 | 110 | | c | 3 | 1 | 4 |
| 6~7 | 1110 | | c | 4 | 1 | 5 |
| 8~9 | 11110 | | c | 5 | 1 | 6 |
| 10~11 | 111110 | | c | 6 | 1 | 7 |
| 12~13 | 1111110 | | c | 7 | 1 | 8 |
| 14~15 | 11111110 | | c | 8 | 1 | 9 |
| 16~17 | 111111110 | | c | 9 | 1 | 10 |
| 18~21 | 1111111110 | x | c | 10 | 2 | 12 |
| 22~29 | 11111111110 | xx | c | 11 | 3 | 14 |
| 30~45 | 111111111110 | xxx | c | 12 | 4 | 16 |
| 46~77 | 1111111111110 | xxxx | c | 13 | 5 | 18 |
| 78~141 | 11111111111110 | xxxxx | c | 14 | 6 | 20 |
| 142~269 | 111111111111110 | xxxxxx | c | 15 | 7 | 22 |
| 270~525 | 1111111111111110 | xxxxxxx | c | 16 | 8 | 24 |
| 526~1037 | 11111111111111110 | xxxxxxxx | c | 17 | 9 | 26 |
| 1038~2061 | 111111111111111110 | xxxxxxxxx | c | 18 | 10 | 28 |
| 2062~4109 | 1111111111111111110 | xxxxxxxxxx | c | 19 | 11 | 30 |
| 4110~8205 | 11111111111111111110 | xxxxxxxxxxx | c | 20 | 12 | 32 |
| 8206~16397 | 111111111111111111110 | xxxxxxxxxxxx | c | 21 | 13 | 34 |
| 16398~32781 | 1111111111111111111110 | xxxxxxxxxxxxx | c | 22 | 14 | 36 |

Embodiments of the invention provide for CABAC coding with a reduced number of context coded and/or bypass coded bins. In some embodiments, rather than using only truncated unary binarization for the syntax element representing the delta quantization parameter and context coding all of the resulting bins, a different binarization is used and only part of the resulting bins are context coded, thus reducing the worst case number of context coded bins for this syntax element. In some embodiments, a different binarization is used for the syntax element representing the remaining actual value of a transform coefficient (referred to as coeff_abs_level_remaining herein) that restricts the maximum codeword length of this syntax element to 32 bits or less, thus reducing the number of bypass coded bins for this syntax element.

Figure 3:
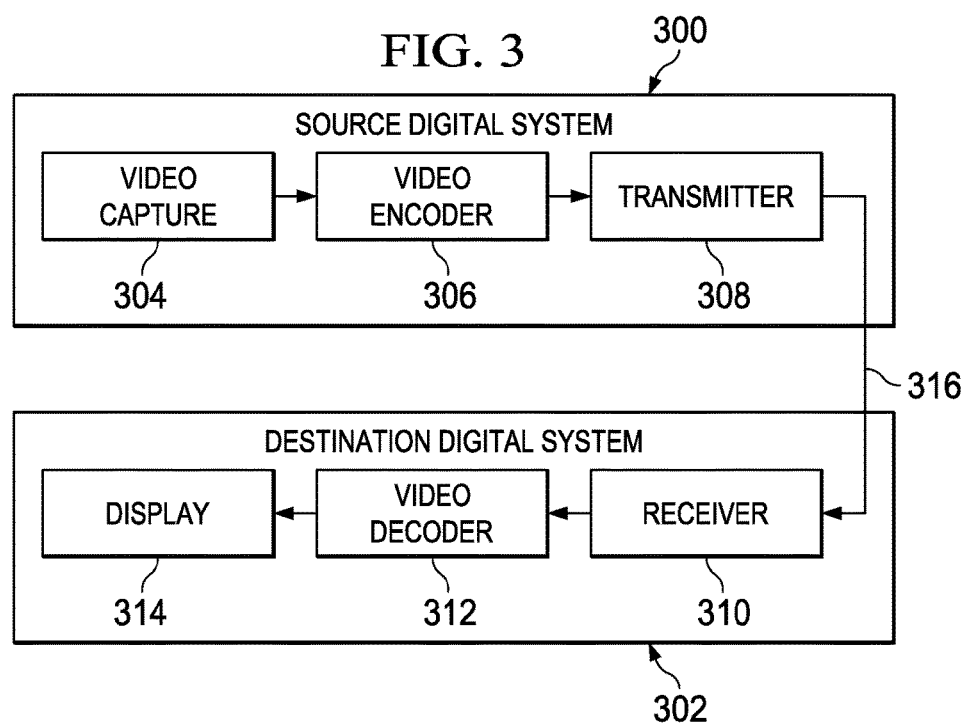
FIG. 3 is a block diagram of a digital system.

FIG. 3 shows a block diagram of a digital system that includes a source digital system 300 that transmits encoded video sequences to a destination digital system 302 via a communication channel 316. The source digital system 300 includes a video capture component 304, a video encoder component 306, and a transmitter component 308. The video capture component 304 is configured to provide a video sequence to be encoded by the video encoder component 306. The video capture component 304 may be, for example, a video camera, a video archive, or a video feed from a video content provider. In some embodiments, the video capture component 304 may generate computer graphics as the video sequence, or a combination of live video, archived video, and/or computer-generated video.

The video encoder component 306 receives a video sequence from the video capture component 304 and encodes it for transmission by the transmitter component 308. The video encoder component 306 receives the video sequence from the video capture component 304 as a sequence of pictures, divides the pictures into largest coding units (LCUs), and encodes the video data in the LCUs. The video encoder component 306 may be configured to perform CABAC encoding of delta quantization parameter syntax elements and/or transform coefficient remaining value syntax elements during the encoding process as described herein. An embodiment of the video encoder component 306 is described in more detail herein in reference to FIG. 4.

The transmitter component 308 transmits the encoded video data to the destination digital system 302 via the communication channel 316. The communication channel 316 may be any communication medium, or combination of communication media suitable for transmission of the encoded video sequence, such as, for example, wired or wireless communication media, a local area network, or a wide area network.

The destination digital system 302 includes a receiver component 310, a video decoder component 312 and a display component 314. The receiver component 310 receives the encoded video data from the source digital system 300 via the communication channel 316 and provides the encoded video data to the video decoder component 312 for decoding. The video decoder component 312 reverses the encoding process performed by the video encoder component 306 to reconstruct the LCUs of the video sequence. The video decoder component 312 may be configured to perform CABAC decoding of delta quantization parameter syntax elements and/or transform coefficient remaining value syntax elements during the decoding process as described herein. An embodiment of the video decoder component 312 is described in more detail below in reference to FIG. 5.

The reconstructed video sequence is displayed on the display component 314. The display component 314 may be any suitable display device such as, for example, a plasma display, a liquid crystal display (LCD), a light emitting diode (LED) display, etc.

In some embodiments, the source digital system 300 may also include a receiver component and a video decoder component and/or the destination digital system 302 may include a transmitter component and a video encoder component for transmission of video sequences both directions for video steaming, video broadcasting, and video telephony. Further, the video encoder component 306 and the video decoder component 312 may perform encoding and decoding in accordance with one or more video compression standards. The video encoder component 306 and the video decoder component 312 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 4:
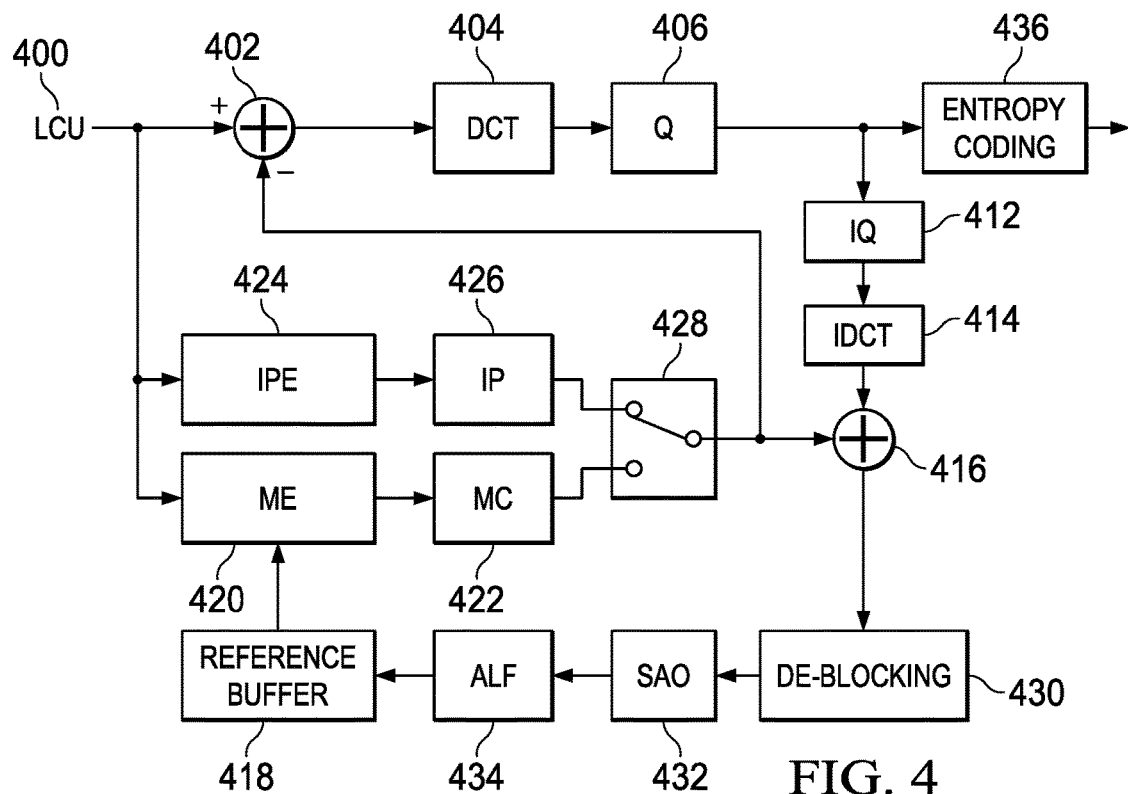
FIG. 4 is a block diagram of a video encoder.

FIG. 4 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 400 of the input video sequence from the coding control component and encodes the LCUs 400 under the control of the coding control component to generate the compressed video stream. The LCUs 400 in each picture are processed in row order. The LCUs 400 from the coding control component are provided as one input of a motion estimation component (ME) 420, as one input of an intra-prediction estimation component (IPE) 424, and to a positive input of a combiner 402 (e.g., adder or subtractor or the like). Further, although not specifically shown, the prediction mode of each picture as selected by the coding control component is provided to a mode decision component 428 and the entropy coding component 436.

The storage component 418 provides reference data to the motion estimation component 420 and to the motion compensation component 422. The reference data may include one or more previously encoded and decoded pictures, i.e., reference pictures.

The motion estimation component 420 provides motion data information to the motion compensation component 422 and the entropy coding component 436. More specifically, the motion estimation component 420 performs tests on CUs in an LCU based on multiple inter-prediction modes (e.g., skip mode, merge mode, and normal or direct inter-prediction), prediction unit sizes, and transform unit sizes using reference picture data from storage 418 to choose the best CU partitioning, prediction unit/transform unit partitioning, inter-prediction modes, motion vectors, etc. based on coding cost, e.g., a rate distortion coding cost. To perform the tests, the motion estimation component 420 may divide an LCU into CUs according to the maximum hierarchical depth of the quadtree, and divide each CU into prediction units according to the unit sizes of the inter-prediction modes and into transform units according to the transform unit sizes, and calculate the coding costs for each prediction unit size, prediction mode, and transform unit size for each CU. The motion estimation component 420 provides the motion vector (MV) or vectors and the prediction mode for each prediction unit in the selected CU partitioning to the motion compensation component (MC) 422.

The motion compensation component 422 receives the selected inter-prediction mode and mode-related information from the motion estimation component 420 and generates the inter-predicted CUs. The inter-predicted CUs are provided to the mode decision component 428 along with the selected inter-prediction modes for the inter-predicted prediction units and corresponding transform unit sizes for the selected partitioning. The coding costs of the inter-predicted CUs are also provided to the mode decision component 428.

The intra-prediction estimation component 424 (IPE) performs intra-prediction estimation in which tests on CUs in an LCU based on multiple intra-prediction modes, prediction unit sizes, and transform unit sizes are performed using reconstructed data from previously encoded neighboring CUs stored in a buffer (not shown) to choose the best CU partitioning, prediction unit/transform unit partitioning, and intra-prediction modes based on coding cost, e.g., a rate distortion coding cost. To perform the tests, the intra-prediction estimation component 424 may divide an LCU into CUs according to the maximum hierarchical depth of the quadtree, and divide each CU into prediction units according to the unit sizes of the intra-prediction modes and into transform units according to the transform unit sizes, and calculate the coding costs for each prediction unit size, prediction mode, and transform unit size for each prediction unit. The intra-prediction estimation component 424 provides the selected intra-prediction modes for the prediction unis, and the corresponding transform unit sizes for the selected CU partitioning to the intra-prediction component (IP) 426. The coding costs of the intra-predicted CUs are also provided to the intra-prediction component 426.

The intra-prediction component 426 (IP) receives intra-prediction information, e.g., the selected mode or modes for the prediction unt(s), the prediction unit size, etc., from the intra-prediction estimation component 424 and generates the intra-predicted CUs. The intra-predicted CUs are provided to the mode decision component 428 along with the selected intra-prediction modes for the intra-predicted PUs and corresponding transform unit sizes for the selected partitioning. The coding costs of the intra-predicted CUs are also provided to the mode decision component 428.

The mode decision component 428 selects between intra-prediction of a CU and inter-prediction of a CU based on the intra-prediction coding cost of the CU from the intra-prediction component 426, the inter-prediction coding cost of the CU from the motion compensation component 422, and the picture prediction mode provided by the coding control component. Based on the decision as to whether a CU is to be intra- or inter-coded, the intra-predicted prediction units or inter-predicted prediction units are selected. The selected partitioning with corresponding modes and other mode related prediction data (if any) such as motion vector(s) and reference picture index (indices), are provided to the entropy coding component 436.

The output of the mode decision component 428, i.e., the predicted prediction units, is provided to a negative input of the combiner 402 and to the combiner 438. The associated transform unit size is also provided to the transform component 404. The combiner 402 subtracts a predicted prediction unit from the original prediction unit. Each resulting residual prediction unit is a set of pixel difference values that quantify differences between pixel values of the original prediction unit and the predicted prediction unit. The residual blocks of all the prediction units of a CU form a residual CU for further processing.

The transform component 404 performs block transforms on the residual CUs to convert the residual pixel values to transform coefficients and provides the transform coefficients to a quantize component 406. More specifically, the transform component 404 receives the transform unit sizes for the residual CU and applies transforms of the specified sizes to the CU to generate transform coefficients. Further, the quantize component 406 quantizes the transform coefficients based on quantization parameters (QPs) and quantization matrices provided by the coding control component and the transform sizes and provides the quantized transform coefficients to the entropy coding component 436 for coding in the bit stream.

The entropy coding component 436 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the partitioning of an LCU, the prediction modes for the CUs, the quantized transform coefficients for the CUs, and a delta quantization parameter for each CU. The entropy coding component 436 encodes the syntax elements using CABAC encoding. The entropy coding component 436 may entropy encode the delta quantization parameter syntax elements and/or the transform coefficient remaining actual value syntax elements according to techniques described herein.

The LCU processing component 442 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 412, which outputs a reconstructed version of the transform result from the transform component 404. The dequantized transform coefficients are provided to the inverse transform component (IDCT) 414, which outputs estimated residual information representing a reconstructed version of a residual CU. The inverse transform component 414 receives the transform unit size used to generate the transform coefficients and applies inverse transform(s) of the specified size to the transform coefficients to reconstruct the residual values. The reconstructed residual CU is provided to the combiner 438.

The combiner 438 adds the original predicted CU to the residual CU to generate a reconstructed CU, which becomes part of reconstructed picture data. The reconstructed picture data is stored in a buffer (not shown) for use by the intra-prediction estimation component 424.

Various in-loop filters may be applied to the reconstructed picture data to improve the quality of the reference picture data used for encoding/decoding of subsequent pictures. The in-loop filters may include a deblocking filter 430, a sample adaptive offset filter (SAO) 432, and an adaptive loop filter (ALF) 434. The in-loop filters 430, 432, 434 are applied to each reconstructed LCU in the picture and the final filtered reference picture data is provided to the storage component 418. In some embodiments, the ALF component 434 is not present.

Figure 5:
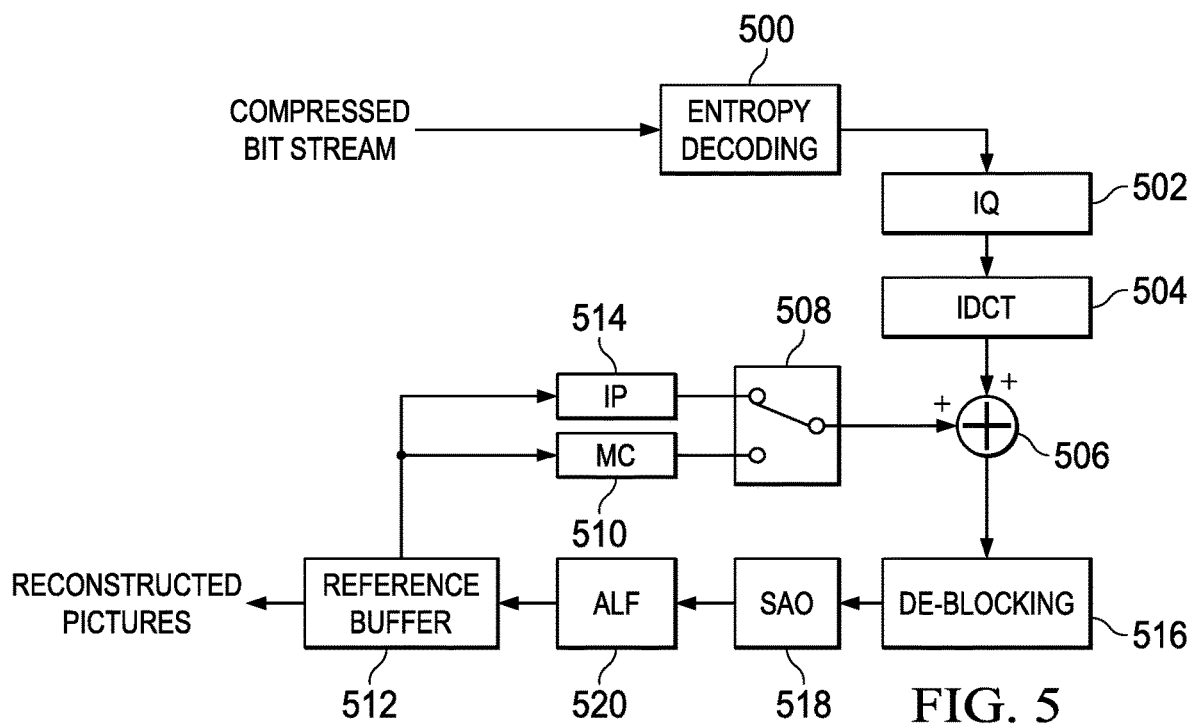
FIG. 5 is a block diagram of a video decoder.

FIG. 5 is a block diagram of an example video decoder. The entropy decoding component 500 receives an entropy encoded (compressed) video bit stream and reverses the entropy encoding using CABAC decoding to recover the encoded syntax elements, e.g., CU, prediction unit, and transform unit structures of LCUs, quantized transform coefficients for CUs, a delta quantization parameter for each CU, motion vectors, prediction modes, in-loop filter parameters, etc. The entropy decoding component 500 decodes the syntax elements using CABAC decoding. The entropy decoding component 500 may entropy decode the delta quantization parameter syntax elements and/or the transform coefficient remaining value syntax elements according to techniques described herein. The decoded syntax elements are passed to the various components of the decoder as needed. For example, decoded prediction modes are provided to the intra-prediction component (IP) 514 or motion compensation component (MC) 510. If the decoded prediction mode is an inter-prediction mode, the entropy decoder 500 reconstructs the motion vector(s) as needed and provides the motion vector(s) to the motion compensation component 510.

The inverse quantize component (IQ) 502 de-quantizes the quantized transform coefficients of the CUs. The inverse transform component 504 transforms the frequency domain data from the inverse quantize component 502 back to the residual CUs. That is, the inverse transform component 504 applies an inverse unit transform, i.e., the inverse of the unit transform used for encoding, to the de-quantized residual coefficients to produce reconstructed residual values of the CUs.

A residual CU supplies one input of the addition component 506. The other input of the addition component 506 comes from the mode switch 508. When an inter-prediction mode is signaled in the encoded video stream, the mode switch 508 selects predicted PUs from the motion compensation component 510 and when an intra-prediction mode is signaled, the mode switch selects predicted PUs from the intra-prediction component 514.

The motion compensation component 510 receives reference data from the storage component 512 and applies the motion compensation computed by the encoder and transmitted in the encoded video bit stream to the reference data to generate a predicted PU. That is, the motion compensation component 510 uses the motion vector(s) from the entropy decoder 500 and the reference data to generate a predicted PU.

The intra-prediction component 514 receives reconstructed samples from previously reconstructed PUs of a current picture from the storage component 512 and performs the intra-prediction computed by the encoder as signaled by an intra-prediction mode transmitted in the encoded video bit stream using the reconstructed samples as needed to generate a predicted PU.

The addition component 506 generates a reconstructed CU by adding the predicted PUs selected by the mode switch 508 and the residual CU. The output of the addition component 506, i.e., the reconstructed CUs, is stored in the storage component 512 for use by the intra-prediction component 514.

In-loop filters may be applied to reconstructed picture data to improve the quality of the decoded pictures and the quality of the reference picture data used for decoding of subsequent pictures. The in-loop filters are the same as those of the encoder, i.e., a deblocking filter 516, a sample adaptive offset filter (SAO) 518, and an adaptive loop filter (ALF) 520. The in-loop filters may be applied on an LCU-by-LCU basis and the final filtered reference picture data is provided to the storage component 512. In some embodiments, the ALF component 520 is not present.

Figure 6:
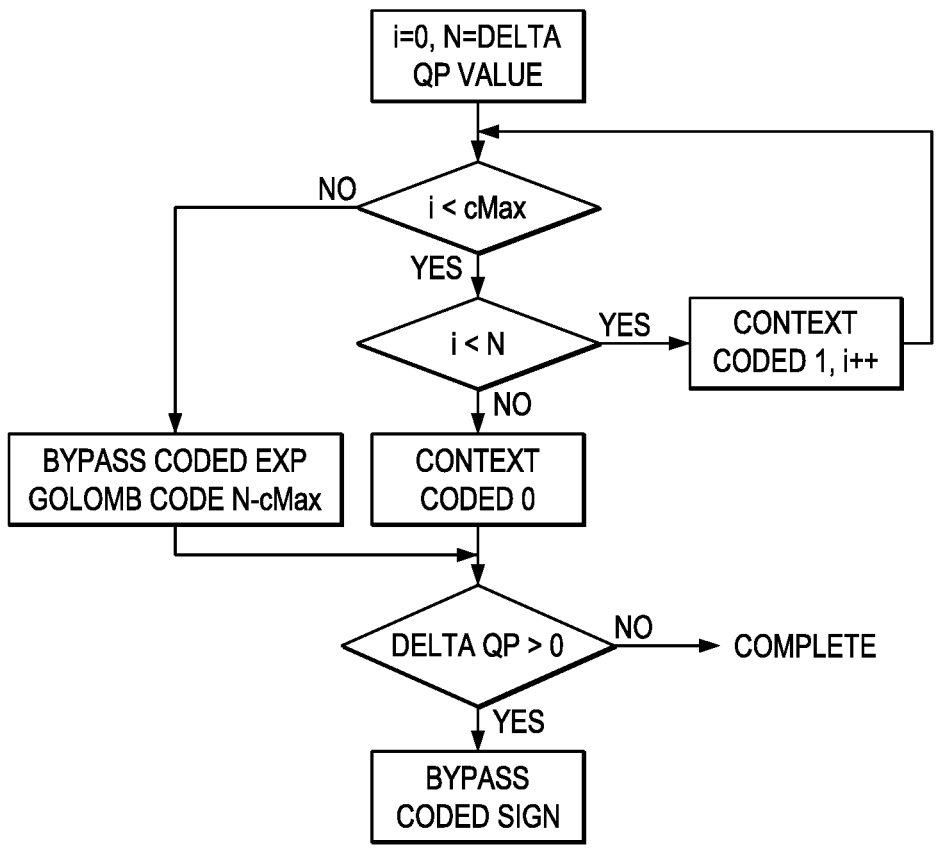
FIGS. 6-11 are flow diagrams of methods.

FIG. 6 is a flow diagram of a method for CABAC encoding of a delta quantization parameter syntax element using a variable length code (VLC) in which the value of the syntax element is binarized using a combination of truncated unary (TU) and kth order exponential Golomb (exp-Golomb) coding. More specifically, a prefix of the syntax element value is binarized using TU coding with a small value of cMax and a suffix is binarized using kth order exp-Golomb coding (EGk). Further, the bins of the TU coded prefix are context-coded and the bins of the EGk coded suffix are bypass coded. Any suitable values of cMax and k may be used. In some embodiments, cMax=4 and k=0. In some embodiments, cMax=5 and k=0.

TU coding is previously explained herein. Exp-Golomb codes are indexed by a non-negative integer value k, referred to as the order of the code. Furthermore, the output of the particular EGk coding used is a three part code word that includes a unary prefix of one bits, a binary suffix, and a separator between the prefix and suffix that is a single zero bit. More specifically, to encode a non-negative integer n using an exp-Golomb code of order k, the number of one bits q in the prefix of the codeword may be calculated as shown in Eq. (1) and the value r of the suffix may be calculated as shown in Eq. (2). The length of the suffix is q+k. The codeword for n consists of a prefix q one bits, the single zero bit separator, and a suffix of q+k bits containing the binary representation of r. The codeword may also be obtained directly as the binary representation of the sum $n+2^k$, zero-extended by q bits. Further, the length of the codeword for n is 2q+k+1.

$$q = \log_2((n+2^k) >> k) \qquad (1)$$

$$r = n + 2^k - 2^{q+k} \qquad (2)$$

Exp-Golomb coding of integers m with negative and non-negative values can be carried out by mapping the negative and non-negative values of m into positive values n. An example mapping is as follows:

mapping from m to n:
if(m<=0) n=−2*m
else n=2*m−1 mapping from n to m:

if (n & 0×1) m=(n+1)/2 else m=−n/2.

Referring again to FIG. 6, in this method, the variable i is a bin counter and the variable N is the absolute value of a delta quantization parameter (delta qp) syntax element. Initially, the value of the bin counter i is set to 0. In this method, for values of N greater than or equal to cMax, cMax bins with a value of 1 are context coded into the compressed bit stream followed by bypass coded bins corresponding to the EGk codeword for N-cMax. For values of N less than cMax and greater than 0, N bins with a value of 1 are context coded into the compressed bit stream followed a context coded bin with a value of 0. If N=0, a single bin with a value of 0 is context coded into the compressed bit stream. If the value of delta qp is not zero, a single bin indicating the sign of delta qp is bypass coded into the compressed bit stream after the value. Table 4 shows the encoding of input values 0-10 according to this method assuming cMax=4 and k=0. Table 5 shows the encoding of input values 0-26 according to this method assuming cMax=5 and k=0. Note that with cMax=5 and k=0, the worst case number of context coded bins is 5 and the worst case number of total bins is 15.

Table 5 assumes a range of −26 to 25 for the value of delta qp. The value range for this syntax element changes based on the bit depth of the video sequence. For 8-bit video, the range is −26 to 25, for 10-bit video, the range is −32 to 31, and for 12-bit video, the range is −38 to 37.

TABLE 4

| Value | Bin string (truncated unary) | Bin string ($0^{th}$ order Exp-Golomb) |
|---|---|---|
| 0 | 0 | |
| 1 | 10 | |
| 2 | 110 | |
| 3 | 1110 | |
| 4 | 1111 | 0 |
| 5 | 1111 | 100 |
| 6 | 1111 | 101 |
| 7 | 1111 | 11000 |
| 8 | 1111 | 11001 |
| 9 | 1111 | 11010 |
| 10 | 1111 | 11011 |

TABLE 5

| Value | Bin string (TU with cMax = 5) | Bin string (EG with k = 0) |
|---|---|---|
| 0 | 0 | |
| 1 | 10 | |
| 2 | 110 | |
| 3 | 1110 | |
| 4 | 11110 | |
| 5 | 11111 | 0 |
| 6 | 11111 | 100 |

TABLE 5-continued

| Value | Bin string (TU with cMax = 5) | Bin string (EG with k = 0) |
|---|---|---|
| 7 | 11111 | 101 |
| 8 | 11111 | 11000 |
| ... | ... | ... |
| 26 | 11111 | 111100110 |

Figure 7:
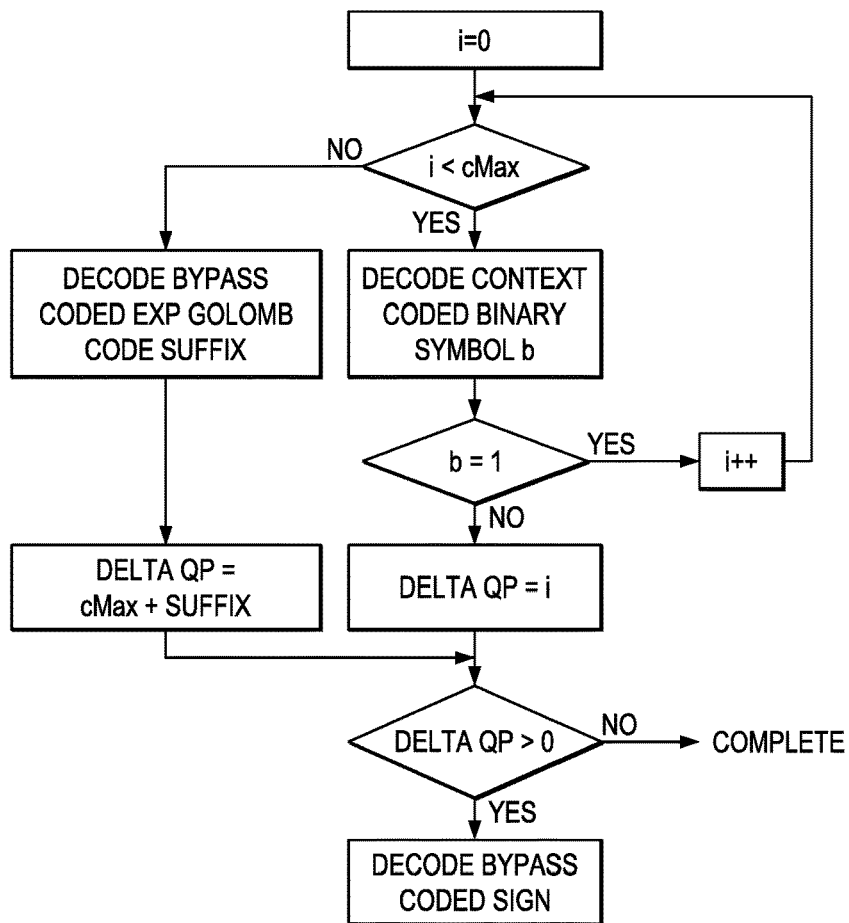

FIG. 7 is a flow diagram of a method for CABAC decoding of a delta quantization parameter syntax element encoded by the method of FIG. 6. In this method, the variable i is a bin counter, the value of which is initially 0. Context coded bins are decoded until either cMax bins with the value of 1 are decoded or a bin with a value of 0 is decoded. If a bin with the value of 0 is decoded before cMax bins are decoded, the value of delta qp is set to b, which is the number of decoded bins with a value of 1. If cMax bins with a value of 1 are decoded, then the bypass coded bins of the EGk coded suffix are decoded and the value of delta qp is set to the sum of cMax and the suffix. After the value of delta qp is decoded, if the value is not zero, then a bypass coded bin indicating the sign of delta qp is decoded and applied to the value.

Figure 8:
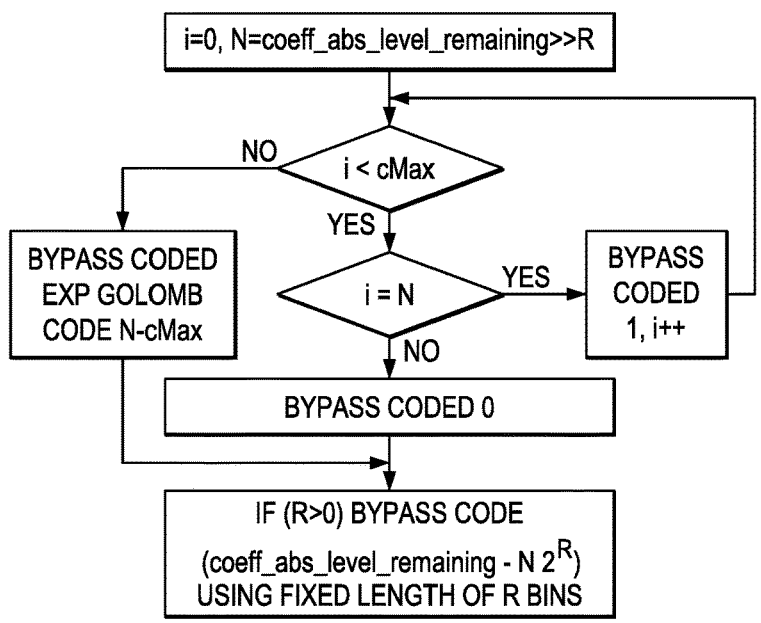
Figure 9:
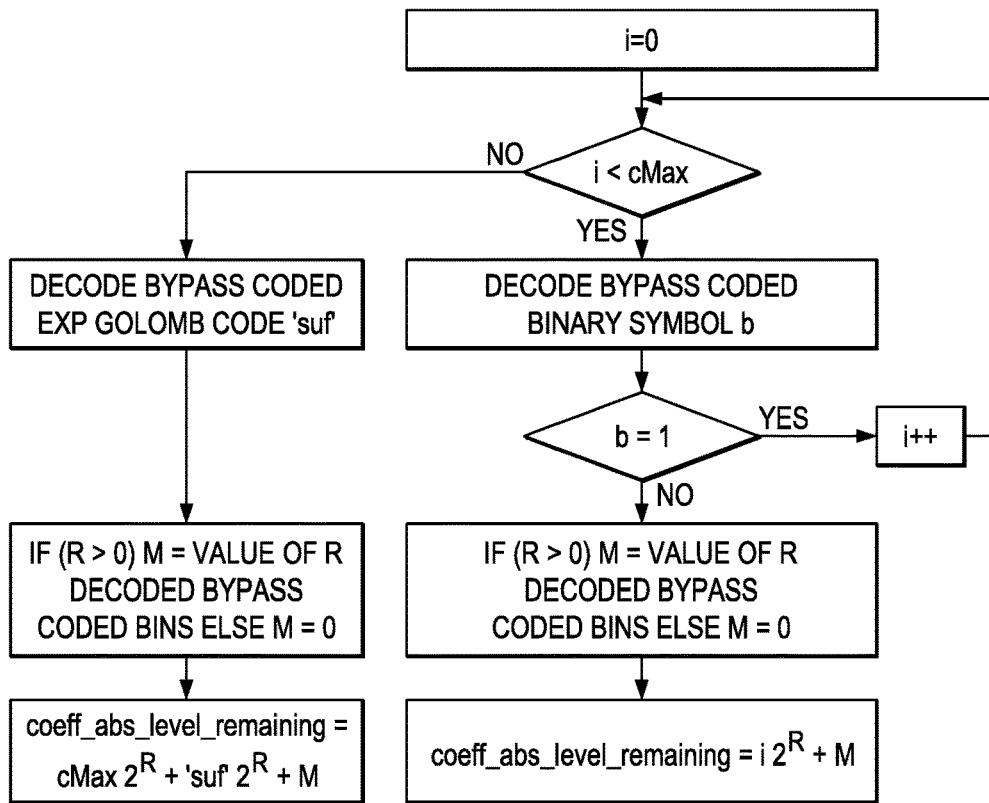

FIGS. 8 and 9, and Tables 8-20, present methods for CABAC coding and decoding of the syntax element representing the remaining actual value of a transform coefficient that limit the worst case (maximum) size of the binarization of this syntax element to 32 bins. For example purposes, this syntax element is referred to herein by the name used in HEVC, i.e., coeff_abs_level_remaining. As previously explained, in the prior art VLC used for binarization of coeff_abs_level_remaining, the worst case codeword length is 37 bins when cParam=0. Tables 8-20 illustrate embodiments of VLCs that restrict the maximum codeword size to 32 bins.

Referring first to Tables 8-18, in the prior art VLC for binarization of coeff_abs_level_remaining, when cParam=0, syntax element values less than 9 are unary coded only, resulting in a worst case codeword length of 37 (see Table 2). As illustrated in Tables 8-18, the VLC can be moved up such that the suffix coding starts for syntax element values smaller than 9, resulting in a worst case codeword length of 32 or less. Tables 8-12 illustrate a VLC in which the suffix coding starts for syntax elements larger than 3. This VLC is referred to as U-FLC123-L32, where the U denotes that the prefix is unary coded, FLC123 denotes that the codeword suffix length increments by 1 for each increase in prefix codeword length, and L32 indicates the maximum codeword length is 32 bits. In this VLC, values 0-3 are unary coded and for values above 3 the codeword is constructed as follows: the first three bits have the value 1, the remainder of the codeword prefix and the codeword suffix are formed by EG(0) of ((coeff_abs-Level-remaining>>cParam)−3), and the fixed length suffix of cParam bits is formed by the binary value of coeff_abs-Level-remaining-((coeff_abs-Level-remaining>>cParam)*$2^{cParam}$). Table 8 shows the VLC for the case where cParam=0, Table 9 shows the VLC for the case where cParam=1, Table 10 shows the VLC for the case where cParam=2, Table 11 shows the VLC for the case where cParam=3, and Table 12 shows the VLC for the case where cParam=4.

Tables 8-18 (and other tables herein) use a notation that allows a compact representation of the full code. The range of possible values of coeff_abs_level_remaining is very large. Rather than listing the individual codewords for each possible syntax element value, lines in a table may represent several codewords. The characters "x" and "c" are used to indicate the number of bits, respectively, in the codeword suffix and the fixed length suffix for ranges of input values. Further, the number of "c" bits depends on the value of cParam. The actual values of these bits will differ for each input value in the range. For example, Table 6 illustrates the expansion of a line in Table 8, and Table 7 illustrates the expansion of a line in Table 11.

TABLE 6

| Input Value | Codeword prefix | Codeword suffix | Fixed length suffix | Prefix code length | Suffix code length | Total code length |
|---|---|---|---|---|---|---|
| 6~9 | 111110 | xx | | 6 | 2 | 8 |
| Actual table | | | | | | |
| 6 | 111110 | 00 | | | | |
| 7 | 111110 | 01 | | | | |
| 8 | 111110 | 10 | | | | |
| 9 | 111110 | 11 | | | | |

TABLE 7

| Input Value | Codeword prefix | Codeword suffix | Fixed length suffix | Prefix code length | Suffix code length | Total code length |
|---|---|---|---|---|---|---|
| 32~47 | 11110 | x | ccc | 5 | 4 | 9 |
| Actual table | | | | | | |
| 32 | 11110 | 0 | 000 | | | |
| 33 | 11110 | 0 | 001 | | | |
| 34 | 11110 | 0 | 010 | | | |
| 35 | 11110 | 0 | 011 | | | |
| 36 | 11110 | 0 | 100 | | | |
| 37 | 11110 | 0 | 101 | | | |
| 38 | 11110 | 0 | 110 | | | |
| 39 | 11110 | 0 | 111 | | | |
| 40 | 11110 | 1 | 000 | | | |
| 41 | 11110 | 1 | 001 | | | |
| 42 | 11110 | 1 | 010 | | | |
| 43 | 11110 | 1 | 011 | | | |
| 44 | 11110 | 1 | 100 | | | |
| 45 | 11110 | 1 | 101 | | | |
| 46 | 11110 | 1 | 110 | | | |
| 47 | 11110 | 1 | 111 | | | |

TABLE 8

| Input Value | Codeword prefix | Codeword suffix | Fixed len suffix | Prefix code len | Suffix code len | Total code len |
|---|---|---|---|---|---|---|
| 0 | 0 | | | 1 | 0 | 1 |
| 1 | 10 | | | 2 | 0 | 2 |
| 2 | 110 | | | 3 | 0 | 3 |
| 3 | 1110 | | | 4 | 0 | 4 |
| 4~5 | 11110 | x | | 5 | 1 | 6 |
| 6~9 | 111110 | xx | | 6 | 2 | 8 |
| 10~17 | 1111110 | xxx | | 7 | 3 | 10 |
| 18~33 | 11111110 | xxxx | | 8 | 4 | 12 |
| 34~65 | 111111110 | xxxxx | | 9 | 5 | 14 |
| 66~129 | 1111111110 | xxxxxx | | 10 | 6 | 16 |
| 130~257 | 11111111110 | xxxxxxx | | 11 | 7 | 18 |
| 258~513 | 111111111110 | xxxxxxxx | | 12 | 8 | 20 |
| 514~1025 | 1111111111110 | xxxxxxxxx | | 13 | 9 | 22 |
| 1026~2049 | 11111111111110 | xxxxxxxxxx | | 14 | 10 | 24 |
| 2050~4097 | 111111111111110 | xxxxxxxxxxx | | 15 | 11 | 26 |
| 4098~8193 | 1111111111111110 | xxxxxxxxxxxx | | 16 | 12 | 28 |
| 8194~16385 | 11111111111111110 | xxxxxxxxxxxxx | | 17 | 13 | 30 |
| 16386~32769 | 111111111111111110 | xxxxxxxxxxxxxx | | 18 | 14 | 32 |

TABLE 9

| Input Value | Codeword prefix | Codeword suffix | Fixed length suffix | Prefix code length | Suffix code length | Total code length |
|---|---|---|---|---|---|---|
| 0~1 | 0 | | c | 1 | 1 | 2 |
| 2~3 | 10 | | c | 2 | 1 | |
| 4~5 | 110 | | c | 3 | 1 | 4 |
| 6~7 | 1110 | | c | 4 | 1 | 5 |
| 8~11 | 11110 | x | c | 5 | 2 | 7 |
| 12~19 | 111110 | xx | c | 6 | 3 | 9 |
| 20~35 | 1111110 | xxx | c | 7 | 4 | 11 |
| 36~67 | 11111110 | xxxx | c | 8 | 5 | 13 |
| 68~131 | 111111110 | xxxxx | c | 9 | 6 | 15 |
| 132~259 | 1111111110 | xxxxxx | c | 10 | 7 | 17 |
| 260~515 | 11111111110 | xxxxxxx | c | 11 | 8 | 19 |
| 516~1027 | 111111111110 | xxxxxxxx | c | 12 | 9 | 21 |
| 1028~2051 | 1111111111110 | xxxxxxxxx | c | 13 | 10 | 23 |

TABLE 9-continued

| Input Value | Codeword prefix | Codeword suffix | Fixed length suffix | Prefix code length | Suffix code length | Total code length |
|---|---|---|---|---|---|---|
| 2052~4099 | 11111111111110 | xxxxxxxxx | c | 14 | 11 | 25 |
| 4100~8195 | 111111111111110 | xxxxxxxxxx | c | 15 | 12 | 27 |
| 8196~16387 | 1111111111111110 | xxxxxxxxxxx | c | 16 | 13 | 29 |
| 16388~32771 | 11111111111111110 | xxxxxxxxxxxx | c | 17 | 14 | 31 |

TABLE 10

| Input Value | Codeword prefix | Codeword suffix | Fixed length suffix | Prefix code length | Suffix code length | Total code length |
|---|---|---|---|---|---|---|
| 0~3 | 0 | | cc | 1 | 2 | 3 |
| 4~7 | 10 | | cc | 2 | 2 | 4 |
| 8~11 | 110 | | cc | 3 | 2 | 5 |
| 12~15 | 1110 | | cc | 4 | 2 | 6 |
| 16~23 | 11110 | x | cc | 5 | 3 | 8 |
| 24~39 | 111110 | xx | cc | 6 | 4 | 10 |
| 40~71 | 1111110 | xxx | cc | 7 | 5 | 12 |
| 72~135 | 11111110 | xxxx | cc | 8 | 6 | 14 |
| 136~263 | 111111110 | xxxxx | cc | 9 | 7 | 16 |
| 264~519 | 1111111110 | xxxxxx | cc | 10 | 8 | 18 |
| 520~1031 | 11111111110 | xxxxxxx | cc | 11 | 9 | 20 |
| 1032~2055 | 111111111110 | xxxxxxxx | cc | 12 | 10 | 22 |
| 2056~4103 | 1111111111110 | xxxxxxxxx | cc | 13 | 11 | 24 |
| 4104~8199 | 11111111111110 | xxxxxxxxxx | cc | 14 | 12 | 26 |
| 8200~16391 | 111111111111110 | xxxxxxxxxxx | cc | 15 | 13 | 28 |
| 16392~32775 | 1111111111111110 | xxxxxxxxxxxx | cc | 16 | 14 | 30 |

TABLE 11

| Input Value | Codeword prefix | Codeword suffix | Fixed length suffix | Prefix code length | Suffix code length | Total code length |
|---|---|---|---|---|---|---|
| 0~7 | 0 | | ccc | 1 | 3 | 4 |
| 8~15 | 10 | | ccc | 2 | 3 | 5 |
| 16~23 | 110 | | ccc | 3 | 3 | 6 |
| 24~31 | 1110 | | ccc | 4 | 3 | 7 |
| 32~47 | 11110 | x | ccc | 5 | 4 | 9 |
| 48~79 | 111110 | xx | ccc | 6 | 5 | 11 |
| 80~143 | 1111110 | xxx | ccc | 7 | 6 | 13 |
| 144~271 | 11111110 | xxxx | ccc | 8 | 7 | 15 |
| 272~527 | 111111110 | xxxxx | ccc | 9 | 8 | 17 |
| 528~1039 | 1111111110 | xxxxxx | ccc | 10 | 9 | 19 |
| 1040~2063 | 11111111110 | xxxxxxx | ccc | 11 | 10 | 21 |
| 2064~4111 | 111111111110 | xxxxxxxx | ccc | 12 | 11 | 23 |
| 4112~8207 | 1111111111110 | xxxxxxxxx | ccc | 13 | 12 | 25 |
| 8208~16399 | 11111111111110 | xxxxxxxxxx | ccc | 14 | 13 | 27 |
| 16400~32783 | 111111111111110 | xxxxxxxxxxx | ccc | 15 | 14 | 29 |

TABLE 12

| Input Value | Codeword prefix | Codeword suffix | Fixed length suffix | Prefix code length | Suffix code length | Total code length |
|---|---|---|---|---|---|---|
| 0~15 | 0 | | cccc | 1 | 4 | 5 |
| 16~31 | 10 | | cccc | 2 | 4 | 6 |
| 32~47 | 110 | | cccc | 3 | 4 | 7 |
| 48~63 | 1110 | | cccc | 4 | 4 | 8 |
| 64~95 | 11110 | x | cccc | 5 | 5 | 10 |
| 96~159 | 111110 | xx | cccc | 6 | 6 | 12 |
| 160~287 | 1111110 | xxx | cccc | 7 | 7 | 14 |

TABLE 12-continued

| Input Value | Codeword prefix | Codeword suffix | Fixed length suffix | Prefix code length | Suffix code length | Total code length |
|---|---|---|---|---|---|---|
| 288~543 | 11111110 | xxxx | cccc | 8 | 8 | 16 |
| 544~1055 | 111111110 | xxxxx | cccc | 9 | 9 | 18 |
| 1056~2079 | 1111111110 | xxxxxx | cccc | 10 | 10 | 20 |
| 2080~4127 | 11111111110 | xxxxxxx | cccc | 11 | 11 | 22 |
| 4128~8223 | 111111111110 | xxxxxxxx | cccc | 12 | 12 | 24 |
| 8224~16415 | 1111111111110 | xxxxxxxxx | cccc | 13 | 13 | 26 |
| 16416~32799 | 11111111111110 | xxxxxxxxxx | cccc | 14 | 14 | 28 |

Tables 13-17 illustrate a VLC in which the suffix coding starts for syntax elements larger than 3 and truncated unary coding is used for the codeword prefix. This VLC is referred to as TU-FLC123-L31, where the TU denotes that the prefix is truncated unary coded, FLC123 denotes that the length of the codeword suffix increments by 1 for each increase in prefix codeword length, and L31 indicates the maximum codeword length is 31 bits. Table 13-17 are modified versions of Tables 8-12. Since the maximum value of coeff_abs-level-remaining that can be coded in HEVC is 32768, there will be no VLC entries after the last rows of Tables 8-12. As a result of which the prefix for the last rows of Tables 8-12 can be truncated by removing the zero bit in prefix as shown in the last rows of Tables 13-17, respectively. Tables 13-17 show, respectively, the VLC for the cases where cParam=0, 1, 2, 3, 4.

Tables 13-17 are examples of the use of truncated unary prefix coding. Other table sets can be created by varying the point at which the suffix coding starts for cParam=0. For example, if suffix coding starts at values larger than 4 and truncated unary coding is used for the codeword prefix, a TU-FLC123-L32 codeword results as shown in Table 18 for cParam=0. One of ordinary skill in the art will understand this VLC for larger values of cParam, and will understand that as cParam increases, the maximum codeword length may differ from that for cParam=0, but will not exceed 32 bits.

TABLE 13

| Input Value | Codeword prefix | Codeword suffix | Fixed len suffix | Prefix code len | Suffix code len | Total code len |
|---|---|---|---|---|---|---|
| 0 | 0 | | | 1 | 0 | 1 |
| 1 | 10 | | | 2 | 0 | 2 |
| 2 | 110 | | | 3 | 0 | 3 |
| 3 | 1110 | | | 4 | 0 | 4 |
| 4~5 | 11110 | x | | 5 | 1 | 6 |
| 6~9 | 111110 | xx | | 6 | 2 | 8 |
| 10~17 | 1111110 | xxx | | 7 | 3 | 10 |
| 18~33 | 11111110 | xxxx | | 8 | 4 | 12 |
| 34~65 | 111111110 | xxxxx | | 9 | 5 | 14 |
| 66~129 | 1111111110 | xxxxxx | | 10 | 6 | 16 |
| 130~257 | 11111111110 | xxxxxxx | | 11 | 7 | 18 |
| 258~513 | 111111111110 | xxxxxxxx | | 12 | 8 | 20 |
| 514~1025 | 1111111111110 | xxxxxxxxx | | 13 | 9 | 22 |
| 1026~2049 | 11111111111110 | xxxxxxxxxx | | 14 | 10 | 24 |
| 2050~4097 | 111111111111110 | xxxxxxxxxxx | | 15 | 11 | 26 |
| 4098~8193 | 1111111111111110 | xxxxxxxxxxxx | | 16 | 12 | 28 |
| 8194~16385 | 11111111111111110 | xxxxxxxxxxxxx | | 17 | 13 | 30 |
| 16386~32769 | 11111111111111111 | xxxxxxxxxxxxxx | | 17 | 14 | 31 |

TABLE 14

| Input Value | Codeword prefix | Codeword suffix | Fixed length suffix | Prefix code length | Suffix code length | Total code length |
|---|---|---|---|---|---|---|
| 0~1 | 0 | | c | 1 | 1 | 2 |
| 2~3 | 10 | | c | 2 | 1 | |
| 4~5 | 110 | | c | 3 | 1 | 4 |
| 6~7 | 1110 | | c | 4 | 1 | 5 |
| 8~11 | 11110 | x | c | 5 | 2 | 7 |
| 12~19 | 111110 | xx | c | 6 | 3 | 9 |
| 20~35 | 1111110 | xxx | c | 7 | 4 | 11 |
| 36~67 | 11111110 | xxxx | c | 8 | 5 | 13 |
| 68~131 | 111111110 | xxxxx | c | 9 | 6 | 15 |
| 132~259 | 1111111110 | xxxxxx | c | 10 | 7 | 17 |
| 260~515 | 11111111110 | xxxxxxx | c | 11 | 8 | 19 |
| 516~1027 | 111111111110 | xxxxxxxx | c | 12 | 9 | 21 |
| 1028~2051 | 1111111111110 | xxxxxxxxx | c | 13 | 10 | 23 |

TABLE 14-continued

| Input Value | Codeword prefix | Codeword suffix | Fixed length suffix | Prefix code length | Suffix code length | Total code length |
|---|---|---|---|---|---|---|
| 2052~4099 | 11111111111110 | xxxxxxxxx | c | 14 | 11 | 25 |
| 4100~8195 | 111111111111110 | xxxxxxxxxx | c | 15 | 12 | 27 |
| 8196~16387 | 1111111111111110 | xxxxxxxxxxx | c | 16 | 13 | 29 |
| 16388~32771 | 1111111111111111 | xxxxxxxxxxxx | c | 16 | 14 | 30 |

TABLE 15

| Input Value | Codeword prefix | Codeword suffix | Fixed length suffix | Prefix code length | Suffix code length | Total code length |
|---|---|---|---|---|---|---|
| 0~3 | 0 | | cc | 1 | 2 | 3 |
| 4~7 | 10 | | cc | 2 | 2 | 4 |
| 8~11 | 110 | | cc | 3 | 2 | 5 |
| 12~15 | 1110 | | cc | 4 | 2 | 6 |
| 16~23 | 11110 | x | cc | 5 | 3 | 8 |
| 24~39 | 111110 | xx | cc | 6 | 4 | 10 |
| 40~71 | 1111110 | xxx | cc | 7 | 5 | 12 |
| 72~135 | 11111110 | xxxx | cc | 8 | 6 | 14 |
| 136~263 | 111111110 | xxxxx | cc | 9 | 7 | 16 |
| 264~519 | 1111111110 | xxxxxx | cc | 10 | 8 | 18 |
| 520~1031 | 11111111110 | xxxxxxx | cc | 11 | 9 | 20 |
| 1032~2055 | 111111111110 | xxxxxxxx | cc | 12 | 10 | 22 |
| 2056~4103 | 1111111111110 | xxxxxxxxx | cc | 13 | 11 | 24 |
| 4104~8199 | 11111111111110 | xxxxxxxxxx | cc | 14 | 12 | 26 |
| 8200~16391 | 1111111111111111 | xxxxxxxxxxx | cc | 14 | 13 | 27 |
| 16392~32775 | 1111111111111110 | xxxxxxxxxxxx | cc | 16 | 14 | 30 |

TABLE 16

| Input Value | Codeword prefix | Codeword suffix | Fixed length suffix | Prefix code length | Suffix code length | Total code length |
|---|---|---|---|---|---|---|
| 0~7 | 0 | | ccc | 1 | 3 | 4 |
| 8~15 | 10 | | ccc | 2 | 3 | 5 |
| 16~23 | 110 | | ccc | 3 | 3 | 6 |
| 24~31 | 1110 | | ccc | 4 | 3 | 7 |
| 32~47 | 11110 | x | ccc | 5 | 4 | 9 |
| 48~79 | 111110 | xx | ccc | 6 | 5 | 11 |
| 80~143 | 1111110 | xxx | ccc | 7 | 6 | 13 |
| 144~271 | 11111110 | xxxx | ccc | 8 | 7 | 15 |
| 272~527 | 111111110 | xxxxx | ccc | 9 | 8 | 17 |
| 528~1039 | 1111111110 | xxxxxx | ccc | 10 | 9 | 19 |
| 1040~2063 | 11111111110 | xxxxxxx | ccc | 11 | 10 | 21 |
| 2064~4111 | 111111111110 | xxxxxxxx | ccc | 12 | 11 | 23 |
| 4112~8207 | 1111111111110 | xxxxxxxxx | ccc | 13 | 12 | 25 |
| 8208~16399 | 11111111111110 | xxxxxxxxxx | ccc | 14 | 13 | 27 |
| 16400~32783 | 1111111111111111 | xxxxxxxxxxx | ccc | 14 | 14 | 28 |

TABLE 17

| Input Value | Codeword prefix | Codeword suffix | Fixed length suffix | Prefix code length | Suffix code length | Total code length |
|---|---|---|---|---|---|---|
| 0~15 | 0 | | cccc | 1 | 4 | 5 |
| 16~31 | 10 | | cccc | 2 | 4 | 6 |
| 32~47 | 110 | | cccc | 3 | 4 | 7 |
| 48~63 | 1110 | | cccc | 4 | 4 | 8 |
| 64~95 | 11110 | x | cccc | 5 | 5 | 10 |
| 96~159 | 111110 | xx | cccc | 6 | 6 | 12 |
| 160~287 | 1111110 | xxx | cccc | 7 | 7 | 14 |

TABLE 17-continued

| Input Value | Codeword prefix | Codeword suffix | Fixed length suffix | Prefix code length | Suffix code length | Total code length |
|---|---|---|---|---|---|---|
| 288~543 | 11111110 | xxxx | cccc | 8 | 8 | 16 |
| 544~1055 | 111111110 | xxxxx | cccc | 9 | 9 | 18 |
| 1056~2079 | 1111111110 | xxxxxx | cccc | 10 | 10 | 20 |
| 2080~4127 | 11111111110 | xxxxxxx | cccc | 11 | 11 | 22 |
| 4128~8223 | 111111111110 | xxxxxxxx | cccc | 12 | 12 | 24 |
| 8224~16415 | 1111111111110 | xxxxxxxxx | cccc | 13 | 13 | 26 |
| 16416~32799 | 1111111111111 | xxxxxxxxxx | cccc | 13 | 14 | 27 |

TABLE 18

| Input Value | Codeword prefix | Codeword suffix | Prefix code length | Suffix code length | Total code length |
|---|---|---|---|---|---|
| 0 | 0 | | 1 | 0 | 1 |
| 1 | 10 | | 2 | 0 | 2 |
| 2 | 110 | | 3 | 0 | 3 |
| 3 | 1110 | | 4 | 0 | 4 |
| 4 | 11110 | | 5 | 0 | 5 |
| 5~6 | 111110 | x | 6 | 1 | 7 |
| 7~10 | 1111110 | xx | 7 | 2 | 9 |
| 11~18 | 11111110 | xxx | 8 | 3 | 11 |
| 19~34 | 111111110 | xxxx | 9 | 4 | 13 |
| 35~66 | 1111111110 | xxxxx | 10 | 5 | 15 |
| 67~130 | 11111111110 | xxxxxx | 11 | 6 | 17 |
| 131~258 | 111111111110 | xxxxxxx | 12 | 7 | 19 |
| 259~514 | 1111111111110 | xxxxxxxx | 13 | 8 | 21 |
| 515~1026 | 11111111111110 | xxxxxxxxx | 14 | 9 | 23 |
| 1027~2050 | 111111111111110 | xxxxxxxxxx | 15 | 10 | 25 |
| 2051~4098 | 1111111111111110 | xxxxxxxxxxx | 16 | 11 | 27 |
| 4099~8194 | 11111111111111110 | xxxxxxxxxxxx | 17 | 12 | 29 |
| 8195~16386 | 111111111111111110 | xxxxxxxxxxxxx | 18 | 13 | 31 |
| 16387~32770 | 111111111111111111 | xxxxxxxxxxxxxx | 18 | 14 | 32 |

Tables 19 and 20 illustrate a VLC in which escape coding is used to reduce maximum codeword length to 32. This VLC is the same as that of the prior art VLC (see Table 2) except that escape coding is used to force the codeword suffix to be 15 bits for all values above a selected value. The codeword suffix is coded with 15 bits because the maximum value of coeff_abs-Level-remaining that can be coded in HEVC is 32768. The value at which escape coding starts is controlled by the length of the prefix at which escape coding starts. Table 19 and 20 illustrate examples of escape coding which starts when the prefix length is 17 bits. The corresponding value of coeff_abs-level-remaining at which escape coding will start is 263 in Table 19 and 526 in Table 20.

Table 19 shows the VLC for the case where cParam=0 and Table 20 shows the VLC for the case where cParam=1. One of ordinary skill in the art will understand this VLC for larger values of cParam, and will understand that for higher values of cParam, the input value at which the escape coding is initiated increases but the maximum codeword length remains 32 bits. In this VLC, values 0-8 are unary coded and for values above 8 and less than the value at which the escape coding is initiated, the codeword is constructed as follows: the first eight bits have the value 1, the remainder of the codeword prefix, and the codeword suffix (except for codewords of the highest values in the last line of the table) are formed by EG(0) of ((coeff_abs-Level-remaining>>cParam)-8), and the fixed length suffix of cParam bits is formed by the binary value of coeff_abs-Level-remaining-((coeff_abs-Level-remaining>>cParam)*$2^{cParam}$). For the last line in the table, the codeword is formed as a prefix of 17 bits followed by a fixed length code of 15 bits that directly codes the binary representation of coeff_abs-Level-remaining-8.

TABLE 19

| Input Value | Codeword prefix | Codeword suffix | Prefix code length | Suffix code length | Total code length |
|---|---|---|---|---|---|
| 0 | 0 | | 1 | 0 | 1 |
| 1 | 10 | | 2 | 0 | 2 |
| 2 | 110 | | 3 | 0 | 3 |
| 3 | 1110 | | 4 | 0 | 4 |
| 4 | 11110 | | 5 | 0 | 5 |
| 5 | 111110 | | 6 | 0 | 6 |
| 6 | 1111110 | | 7 | 0 | 7 |

TABLE 19-continued

| Input Value | Codeword prefix | Codeword suffix | Prefix code length | Suffix code length | Total code length |
|---|---|---|---|---|---|
| 7 | 11111110 | | 8 | 0 | 8 |
| 8 | 111111110 | | 9 | 0 | 9 |
| 9~10 | 1111111110 | x | 10 | 1 | 11 |
| 11~14 | 11111111110 | xx | 11 | 2 | 13 |
| 15~22 | 111111111110 | xxx | 12 | 3 | 15 |
| 23~38 | 1111111111110 | xxxx | 13 | 4 | 17 |
| 39~70 | 11111111111110 | xxxxx | 14 | 5 | 19 |
| 71~134 | 111111111111110 | xxxxxx | 15 | 6 | 21 |
| 135~262 | 1111111111111110 | xxxxxxx | 16 | 7 | 23 |
| 263~33030 | 11111111111111110 | xxxxxxxxxxxxxxx | 17 | 15 | 32 |

TABLE 20

| Input Value | Codeword prefix | Codeword suffix | Fixed Length Suffix | Prefix code length | Suffix code length | Total code length |
|---|---|---|---|---|---|---|
| 0~1 | 0 | | c | 1 | 1 | 2 |
| 2~3 | 10 | | c | 2 | 1 | 3 |
| 4~5 | 110 | | c | 3 | 1 | 4 |
| 6~7 | 1110 | | c | 4 | 1 | 5 |
| 8~9 | 11110 | | c | 5 | 1 | 6 |
| 10~11 | 111110 | | c | 6 | 1 | 7 |
| 12~13 | 1111110 | | c | 7 | 1 | 8 |
| 14~15 | 11111110 | | c | 8 | 1 | 9 |
| 16~17 | 111111110 | | c | 9 | 1 | 10 |
| 18~21 | 1111111110 | x | c | 10 | 2 | 12 |
| 22~29 | 11111111110 | xx | c | 11 | 3 | 14 |
| 30~45 | 111111111110 | xxx | c | 12 | 4 | 16 |
| 46~77 | 1111111111110 | xxxx | c | 13 | 5 | 18 |
| 78~141 | 11111111111110 | xxxxx | c | 14 | 6 | 20 |
| 142~269 | 111111111111110 | xxxxxx | c | 15 | 7 | 22 |
| 270~525 | 1111111111111110 | xxxxxxx | c | 16 | 8 | 24 |
| 526~33293 | 11111111111111110 | xxxxxxxxxxxxxxx | | 17 | 15 | 32 |

FIG. 8 is a flow diagram of a method for CABAC encoding of coeff_abs_level_remaining. As is explained in more detail below, embodiments of the method may use one of the above VLCs for binarization. In this method, the variable i is a bin counter, R=cParam, the variable N is the value of coeff_abs_level_remaining right shifted by the value of R, and cMax is the maximum value that is encoded with no codeword suffix. In this method, for values of N less than or equal to cMax, N bins with a value of 1 are bypass coded into the compressed bit stream, followed by a bypass coded bin with a value of 0. For values of N greater than or equal to cMax, N bins with a value of 1 are bypass coded into the compressed bit stream followed by bypass coded bins corresponding to the EGO codeword for N-cMax. For all values of N, if R>0, R additional suffix bins (the fixed length suffix) representing the value of coeff_abs_level_remaining−N2$^R$ are bypass coded into the compressed bit stream.

For the VLC U-FLC123-L32 (Tables 8-12), cMax=3. For the VLC TU-FLC123-L31 (Tables 13-17), cMax=3 and for the VLC of Table 18, cMax=4. Further, the exp-Golomb code is modified for input values starting from $$\left(cMax + \sum_{i=0}^{L-1} 2^i\right) 2^R$$

such that the prefix has only L+cMax 1's and there is no 0 separator between prefix and suffix, where L is the value for which $$\left(cMax + \sum_{i=0}^{L} 2^i\right) 2^R > 32768.$$

For the VLC with escape coding (Tables 19 and 20), cMax=8. Further, the exp-Golomb code is modified for values starting from $$\left(cMax + \sum_{i=0}^{7} 2^i\right) 2^R$$

where escape coding is used. Note that when escape coding is used, the bypass coding of additional cParam bins of the suffix is skipped.

FIG. 9 is a flow diagram of a method for CABAC decoding of coeff_abs_level_remaining as encoded by the method of FIG. 8. In this method, the variable i is a bin counter and R=cParam. Bypass coded bins are decoded until either cMax bins are decoded or a bin with a value of 0 is decoded. If a bin with value of 0 is decoded before cMax bins are decoded, then the value of coeff_abs_level_remaining is set to i 2$^R$+M, where M is the value of R decoded bypass bins when R>0 and is zero otherwise. If cMax bins with a value of 1 are decoded, then the bypass coded bins of the EGO coded part of the value are decoded. The value of coeff_abs_level_remaining is set to cMax $2^R$+'suf' $2^R$+M, where 'suf' is the decoded EGO part of the value and M is the value of R decoded bypass bins when R>0 and is zero otherwise.

For the VLC U-FLC123-L32 (Tables 8-12), cMax=3. For the VLC TU-FLC123-L31 (Tables 13-17), cMax=3 and for the VLC of Table 18, cMax=4. Further, the exp-Golomb decoding is modified for prefix length of L+cMax consisting of all 1's where L is given by $$\left(cMax + \sum_{i=0}^{L} 2^i\right) 2^R > 32768.$$

For this case, there is no 0 separator between the prefix and the suffix. The value of coeff_abs_level_remaining is set to cMax $2^R$+'suf' $2^R$+M, where 'suf' is the decoded EGO part (assuming the separator existed) of the value and M is the value of R decoded bypass bins when R>0 and is zero otherwise. For the VLC with escape coding (Tables 19 and 20), cMax=8. Further, the exp-Golomb decoding is modified for the prefix with length L+cMax+1 with L=8 such that a fixed suffix of 15 bins is read. For the prefix of length L+cMax+1, the value of coeff_abs_level_remaining is set to suffix+cMax. Further, the fixed length suffix of cParam bins is not decoded for this case.

Figure 11:
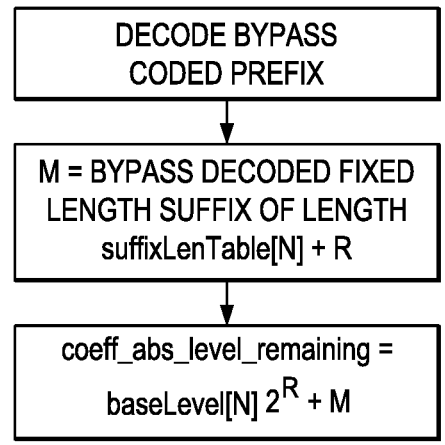
Figure 10:
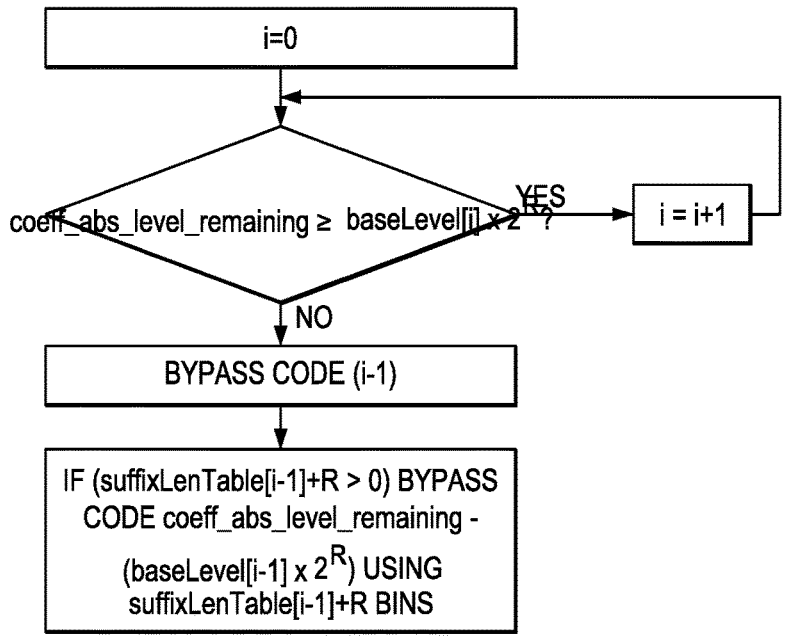

FIGS. 10 and 11, and Tables 21-26, present methods for CABAC coding and decoding of the syntax element representing the remaining actual value of a transform coefficient that limit the worst case (maximum) size of the binarization of this syntax element to 32 bins. For example purposes, this syntax element is referred to herein by the name used in HEVC, i.e., coeff_abs_level_remaining. As previously explained, in the prior art VLC used for binarization of coeff_abs_level_remaining, the worst case codeword length is 37 bins when cParam=0. Tables 21-26 illustrate embodiments of VLCs that restrict the maximum codeword size to 32 bins or less.

Referring first to Tables 21-26, in the prior art VLC (U-FLC123-L37) for binarization of coeff_abs-level-remaining, the codeword suffix increases by one each time the length of the prefix increases by one. In the VLCs of Tables 21-26, the codeword suffix length increases by 2 each time the prefix length increases by one. Tables 21 and 22 illustrate such a VLC in which the maximum codeword length is 32 bits. This VLC is referred to as U-FLC135-L32, where U denotes that the prefix is unary coded, FLC135 denotes that the codeword suffix length increments as 1, 3, 5, 7, 9 . . . , and L32 denotes that the maximum codeword length is 32. Table 21 shows the VLC for cParam=0 and Table 22 shows the VLC for cParam=1. Note that the maximum codeword length is 31 bits for cParam=0. However, for cParam=1, the maximum codeword length is 32 bits.

TABLE 21

| Input Value | Codeword prefix | Codeword suffix | Prefix code length | Suffix code length | Total code length |
|---|---|---|---|---|---|
| 0 | 0 | | 1 | 0 | 1 |
| 1 | 10 | | 2 | 0 | 2 |
| 2 | 110 | | 3 | 0 | 3 |
| 3 | 1110 | | 4 | 0 | 4 |
| 4 | 11110 | | 5 | 0 | 5 |
| 5 | 111110 | | 6 | 0 | 6 |
| 6 | 1111110 | | 7 | 0 | 7 |
| 7 | 11111110 | | 8 | 0 | 8 |
| 8~9 | 111111110 | x | 9 | 1 | 10 |
| 10~17 | 1111111110 | xxx | 10 | 3 | 13 |
| 18~49 | 11111111110 | xxxxx | 11 | 5 | 16 |
| 50~177 | 111111111110 | xxxxxxx | 12 | 7 | 19 |
| 178~689 | 1111111111110 | xxxxxxxxx | 13 | 9 | 22 |
| 690~2737 | 11111111111110 | xxxxxxxxxxx | 14 | 11 | 25 |
| 2738~10929 | 111111111111110 | xxxxxxxxxxxxx | 15 | 13 | 28 |
| 10930~43697 | 1111111111111110 | xxxxxxxxxxxxxxx | 16 | 15 | 31 |

TABLE 22

| Input Value | Codeword prefix | Codeword suffix | Fixed length suffix | Prefix code length | Suffix code length | Total code length |
|---|---|---|---|---|---|---|
| 0~1 | 0 | | c | 1 | 1 | 2 |
| 2~3 | 10 | | c | 2 | 1 | 3 |
| 4~5 | 110 | | c | 3 | 1 | 4 |
| 6~7 | 1110 | | c | 4 | 1 | 5 |
| 8~9 | 11110 | | c | 5 | 1 | 6 |
| 10~11 | 111110 | | c | 6 | 1 | 7 |
| 12~13 | 1111110 | | c | 7 | 1 | 8 |
| 14~15 | 11111110 | | c | 8 | 1 | 9 |
| 16~19 | 111111110 | x | c | 9 | 2 | 11 |
| 20~35 | 1111111110 | xxx | c | 10 | 4 | 14 |
| 36~99 | 11111111110 | xxxxx | c | 11 | 6 | 17 |
| 100~355 | 111111111110 | xxxxxxx | c | 12 | 8 | 20 |

TABLE 22-continued

| Input Value | Codeword prefix | Codeword suffix | Fixed length suffix | Prefix code length | Suffix code length | Total code length |
|---|---|---|---|---|---|---|
| 356~1379 | 1111111111110 | xxxxxxxx | c | 13 | 10 | 23 |
| 1380~5475 | 11111111111110 | xxxxxxxxxx | c | 14 | 12 | 26 |
| 5476~21859 | 111111111111110 | xxxxxxxxxxxx | c | 15 | 14 | 29 |
| 21860~87395 | 1111111111111110 | xxxxxxxxxxxxxx | c | 16 | 16 | 32 |

Tables 23 and 24 illustrate another such a VLC in which the maximum codeword length is 30 bits. This VLC is referred to as U-FLC135-L30, where U denotes that the prefix is unary coded, FLC135 denotes that the codeword suffix length increments as 1, 3, 5, 7, 9 . . . , and L30 denotes that the maximum codeword length is 30 bits. Table 23 shows the VLC for cParam=0 and Table 24 shows the VLC for cParam=1. Note that the maximum codeword length is 29 bits for cParam=0. However, for cParam=1, the maximum codeword length is 30 bits.

TABLE 23

| Input Value | Codeword prefix | Codeword suffix | Prefix code length | Suffix code length | Total code length |
|---|---|---|---|---|---|
| 0 | 0 | | 1 | 0 | 1 |
| 1 | 10 | | 2 | 0 | 2 |
| 2 | 110 | | 3 | 0 | 3 |
| 3 | 1110 | | 4 | 0 | 4 |
| 4 | 11110 | | 5 | 0 | 5 |
| 5 | 111110 | | 6 | 0 | 6 |
| 6~7 | 1111110 | x | 7 | 1 | 8 |
| 8~15 | 11111110 | xxx | 8 | 3 | 11 |
| 16~47 | 111111110 | xxxxx | 9 | 5 | 14 |
| 48~175 | 1111111110 | xxxxxxx | 10 | 7 | 17 |
| 176~687 | 11111111110 | xxxxxxxxx | 11 | 9 | 20 |
| 688~2735 | 111111111110 | xxxxxxxxxxx | 12 | 11 | 23 |
| 2736~10927 | 1111111111110 | xxxxxxxxxxxxx | 13 | 13 | 26 |
| 10928~43695 | 11111111111110 | xxxxxxxxxxxxxxx | 14 | 15 | 29 |

TABLE 24

| Input Value | Codeword prefix | Codeword suffix | Fixed length suffix | Prefix code length | Suffix code length | Total code length |
|---|---|---|---|---|---|---|
| 0~1 | 0 | | c | 1 | 1 | 2 |
| 2~3 | 10 | | c | 2 | 1 | 3 |
| 4~5 | 110 | | c | 3 | 1 | 4 |
| 6~7 | 1110 | | c | 4 | 1 | 5 |
| 8~9 | 11110 | | c | 5 | 1 | 6 |
| 10~11 | 111110 | | c | 6 | 1 | 7 |
| 12~15 | 1111110 | x | c | 7 | 2 | 9 |
| 16~31 | 11111110 | xxx | c | 8 | 4 | 12 |
| 32~95 | 111111110 | xxxxx | c | 9 | 6 | 15 |
| 96~351 | 1111111110 | xxxxxxx | c | 10 | 8 | 18 |
| 352~1375 | 11111111110 | xxxxxxxxx | c | 11 | 10 | 21 |
| 1376~5471 | 111111111110 | xxxxxxxxxxx | c | 12 | 12 | 24 |
| 5472~21855 | 1111111111110 | xxxxxxxxxxxxx | c | 13 | 14 | 27 |
| 21856~87391 | 11111111111110 | xxxxxxxxxxxxxxx | c | 14 | 16 | 30 |

Tables 25 and 26 illustrate another such a VLC in which the maximum codeword length is 29 bits. This VLC is referred to as TU-FLC135-L29, where TU denotes that the prefix is truncated unary coded, FLC135 denotes that the codeword suffix length increments as 1, 3, 5, 7, 9 . . . , and L29 denotes that the maximum codeword length is 29 bits. Table 25 shows the VLC for cParam=0 and Table 26 shows the VLC for cParam=1. Note that the maximum codeword length is 28 bits for cParam=0. However, for cParam=1, the maximum codeword length is 29 bits.

TABLE 25

| Input Value | Codeword prefix | Codeword suffix | Prefix code length | Suffix code length | Total code length |
|---|---|---|---|---|---|
| 0 | 0 | | 1 | 0 | 1 |
| 1 | 10 | | 2 | 0 | 2 |
| 2 | 110 | | 3 | 0 | 3 |
| 3 | 1110 | | 4 | 0 | 4 |
| 4 | 11110 | | 5 | 0 | 5 |
| 5 | 111110 | | 6 | 0 | 6 |
| 6~7 | 1111110 | x | 7 | 1 | 8 |
| 8~15 | 11111110 | xxx | 8 | 3 | 11 |
| 16~47 | 111111110 | xxxxx | 9 | 5 | 14 |
| 48~175 | 1111111110 | xxxxxxx | 10 | 7 | 17 |
| 176~687 | 11111111110 | xxxxxxxxx | 11 | 9 | 20 |
| 688~2735 | 111111111110 | xxxxxxxxxxx | 12 | 11 | 23 |
| 2736~10927 | 1111111111110 | xxxxxxxxxxxxx | 13 | 13 | 26 |
| 10928~43695 | 1111111111111 | xxxxxxxxxxxxxxx | 13 | 15 | 28 |

TABLE 26

| Input Value | Codeword prefix | Codeword suffix | Fixed length suffix | Prefix code length | Suffix code length | Total code length |
|---|---|---|---|---|---|---|
| 0~1 | 0 | | c | 1 | 1 | 2 |
| 2~3 | 10 | | c | 2 | 1 | 3 |
| 4~5 | 110 | | c | 3 | 1 | 4 |
| 6~7 | 1110 | | c | 4 | 1 | 5 |
| 8~9 | 11110 | | c | 5 | 1 | 6 |
| 10~11 | 111110 | | c | 6 | 1 | 7 |
| 12~15 | 1111110 | x | c | 7 | 2 | 9 |
| 16~31 | 11111110 | xxx | c | 8 | 4 | 12 |
| 32~95 | 111111110 | xxxxx | c | 9 | 6 | 15 |
| 96~351 | 1111111110 | xxxxxxx | c | 10 | 8 | 18 |
| 352~1375 | 11111111110 | xxxxxxxxx | c | 11 | 10 | 21 |
| 1376~5471 | 111111111110 | xxxxxxxxxxx | c | 12 | 12 | 24 |
| 5472~21855 | 1111111111110 | xxxxxxxxxxxxx | c | 13 | 14 | 27 |
| 21856~87391 | 1111111111111 | xxxxxxxxxxxxxxx | c | 13 | 16 | 29 |

FIG. 10 is a flow diagram of a method for CABAC encoding of coeff_abs_level_remaining. As is explained in more detail below, embodiments of the method may use one of the VLCs of Tables 21-26 for binarization. In this method, R=cParam, baseLevel is an ordered table of base values in the VLC, suffixLenTable is an ordered table of suffix lengths corresponding to the base values in the baseLevel table, and the variable i is a counter used to index the two tables. A base value is the smallest value in the range of values corresponding to a particular codeword prefix. For example, in Table 21, 6 is the base value for the codeword prefix 1111110, 10 is the base value for the codeword prefix 1111111110, and 10930 is the base value for the codeword prefix 1111111111111110. For the VLC illustrated by Tables 21 and 22, baseLevel[ ]={0, 1, 2, 3, 4, 5, 6, 7, 8, 10, 18, 50, 178, 690, 2738, 10930} and suffixLenTable[ ]={0, 0, 0, 0, 0, 0, 0, 0, 1, 3, 5, 7, 9, 11, 13, 15}. For the VLCs illustrated by Tables 23-26, baseLevel[ ]={0, 1, 2, 3, 4, 5, 6, 8, 16, 48, 176, 688, 2736, 10928} and suffixLenTable[ ]={0, 0, 0, 0, 0, 0, 1, 3, 5, 7, 9, 11, 13, 15}.

In the method of FIG. 10, initially the length of the codeword prefix is determined by iterating sequentially through baseLevel[ ] until the base value in the table corresponding to the value of coeff_abs_level_remaining is reached, i.e., until coeff_abs_level_remaining baseLevel[i]× $2^R$. The value of the index for this table entry indicates the length of the codeword prefix. The value of (i−1) is unary coded for U-FLC135-L32 and U-FLC135-L30 or truncated unary coded for TU-FLC135-L29, and the resulting bins are bypass coded into the compressed bit stream as the codeword prefix for coeff_abs_level_remaining. For example, if coeff_abs_level_remaining=16 and the VLC of Table 21 is used, the base value in baseLevel is at index 9 and i=10. The index value is unary coded to generate the string of bins 1111111110 and the bins are bypass coded into the bit stream.

The codeword suffix, if any, is then bypass coded into the compressed bit stream. More specifically, if the corresponding entry in suffixLenTable is 0, then no codeword suffix is output. Otherwise, the value of coeff_abs_level_remaining−(baseLevel[i−1]×$2^R$) is binarized into suffixLenTable[i−1]+R bins that are bypass coded into the compressed bit stream. Continuing the previous example of coeff_abs_level_re maining=16, i=10 and (i−1)=9, baseLevel[9]=10 and coeff_abs_level_remaining−(baseLevel[i−1]×$2^R$) is 16−10=6. The value of 6 is coded with suffixLenTable[9]=3 bits, i.e., a binary value of 110 is bypass coded as the suffix.

FIG. 11 is a flow diagram of a method for CABAC decoding of coeff_abs_level_remaining as encoded by the method of FIG. 10. In this method, R=cParam, and baseLevel and suffixLenTable are as previously described. Initially, the bypass coded prefix of the value is decoded from the compressed bit stream and the number of bins N in this prefix is determined. The prefix is debinarized using unary coding for U-FLC135-L32 and U-FLC135-L30 or truncated unary coding for TU-FLC135-L29. The bypass coded fixed length suffix M of the value is then decoded from the compressed bit stream. The length of the suffix, i.e., the number of bypass bins to be read from the compressed bit stream, is determined by suffixLenTable[N]+R. The value of coeff_abs_level_remaining is then set to sum of the base value corresponding to the prefix length N in baseLevel and the suffix M, i.e., coeff_abs_level_remaining=baseLevel[N] $2^R$+M.

FIG. 12 is a block diagram of an example digital system suitable for use as an embedded system that may be configured to perform CABAC encoding of delta quantization parameter syntax elements and/or transform coefficient remaining actual value syntax elements during video encoding and/or to perform CABAC decoding of delta quantization parameter syntax elements and/or the transform coefficient remaining actual value syntax elements during video decoding as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1200 is a programmable platform designed to meet the processing needs of applications such as video encode/decode/transcode/transrate, video surveillance, video conferencing, set-top box, medical imaging, media server, gaming, digital signage, etc. The SoC 1200 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1200 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1200, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1200 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 12, the SoC 1200 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 1200 may be configured to perform CABAC encoding of delta quantization parameter syntax elements and/or transform coefficient remaining actual value syntax elements as described herein when encoding a video stream and CABAC decoding of delta quantization parameter syntax elements and/or transform coefficient remaining actual value syntax elements as described herein when decoding a compressed video bit stream. For example, the coding control of the video encoder of FIG. 4 may be executed on the DSP subsystem or the ARM subsystem and at least some of the computational operations of the block processing, including intra-prediction, motion estimation, entropy encoding, and entropy decoding may be executed on the HDVICP coprocessors. Entropy encoding on the HDVICP coprocessors may implement techniques for CABAC encoding of delta quantization parameter syntax elements and/or transform coefficient remaining actual value syntax elements as described herein. Entropy decoding on the HDVICP coprocessors may implement techniques for CABAC decoding of delta quantization parameter syntax elements and/or transform coefficient remaining actual value syntax elements as described herein.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments of methods for encoding and decoding a delta qp syntax element are described herein in which the value is binarized into a TU coded prefix and exp-Golomb coded suffix. One of ordinary skill in the art will understand embodiments in which other suitable codes are used to code the prefix and/or suffix, e.g., both the prefix and the suffix may be TU coded, the prefix may be unary coded and the suffix coded with a fixed length code, or the prefix may be TU coded and the suffix coded with a fixed length code.

In another example, embodiments of methods for encoding and decoding a syntax element for a remaining actual value of a transform coefficient are described herein in which suffix length increases by 1 bit for each 1 bit increase in prefix length and in which suffix length increases by 2 bits for each 1 bit increase in prefix length. One of ordinary skill in the art will understand embodiments in which the increments in suffix length are larger than 2, e.g., embodiments in which the suffix length increases by 3 bits for each 1 bit increase in prefix length. Further, one of ordinary skill in the art will understand embodiments in which the increments in suffix length are not uniform.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for encoding a video sequence in a video encoder to generate a compressed video bit stream, the method comprising:
   determining a value of a syntax element for a remaining value of a transform coefficient;
   binarizing the value using a variable length code (VLC) to generate a sequence of bins, wherein a maximum codeword length of the VLC is 32 bits or less; and
   bypass coding the sequence of bins into the compressed video bit stream.

2. The method of claim 1, wherein the VLC is a code that adapts based on a value of a parameter R, wherein codewords for values less than $4\times2^R$ have a fixed length suffix of R bits, prefixes of codewords are unary coded, suffix length of codewords increases by 1 bit for each 1 bit increase in prefix length, and the maximum codeword length is 32 bits.

3. The method of claim 2, wherein the value of R is one selected from a group consisting of 0, 1, 2, 3, and 4.

4. The method of claim 1, wherein the VLC is a code that adapts based on a value of a parameter R, wherein codewords for values less than $4\times2^R$ have a fixed length suffix of R bits, prefixes of codewords are truncated unary coded, suffix length of codewords increases by 1 bit for each 1 bit increase in prefix length, and the maximum codeword length is 31 bits.

5. The method of claim 1, wherein the VLC is a code that adapts based on a value of a parameter R, wherein codewords for values less than $5\times2^R$ have a fixed length suffix of R bits, prefixes of codewords are truncated unary coded, suffix length of codewords increases by 1 bit for each 1 bit increase in prefix length, and the maximum codeword length is 32 bits.

6. The method of claim 1, wherein the VLC is a code that adapts based on a value of a parameter R, wherein codewords for values less than $8\times2^R$ have a fixed length suffix of R bits, prefixes of codewords are unary coded, suffix length of codewords increases by 1 bit for each 1 bit increase in prefix length for syntax element values less than $263\times2^R$, suffix length of codewords for syntax element values greater than or equal to $263\times2^R$ is 15 bits, and the maximum codeword length is 32 bits.

7. The method of claim 1, wherein the VLC is a code that adapts based on a value of a parameter R, wherein codewords for values less than $8\times2^R$ have a fixed length suffix of R bits, prefixes of codewords are unary coded, suffix length of codewords increases by 2 bits for each 1 bit increase in prefix length, and the maximum codeword length is 32 bits.

8. The method of claim 1, wherein the VLC is a code that adapts based on a value of a parameter R, wherein codewords for values less than $6\times2^R$ have a fixed length suffix of R bits, prefixes of codewords are unary coded, suffix length of codewords increases by 2 bits for each 1 bit increase in prefix length, and the maximum codeword length is 30 bits.

9. The method of claim 1, wherein the VLC is a code that adapts based on a value of a parameter R, wherein codewords for values less than $6\times2^R$ have a fixed length suffix of R bits, prefixes of codewords are unary coded, suffix length of codewords increases by 2 bits for each 1 bit increase in prefix length, and the maximum codeword length is 29 bits.

10. A method for decoding a compressed video bit stream in a video decoder, the method comprising:
    bypass decoding a sequence of bins from the compressed video bit stream, the sequence of bins comprising a prefix and a suffix of a binarized value of a syntax element for a remaining actual value of a transform coefficient; and
    debinarizing the sequence of bins using a variable length code (VLC) to determine a value of the syntax element, wherein a maximum codeword length of the VLC is 32 bits or less.

11. The method of claim 10, wherein the VLC is a code that adapts based on a value of a parameter R, wherein codewords for values less than $4\times2^R$ have a fixed length suffix of R bits, prefixes of codewords are unary coded, suffix length of codewords increases by 1 bit for each 1 bit increase in prefix length, and the maximum codeword length is 32 bits.

12. The method of claim 10, wherein the value of R is one selected from a group consisting of 0, 1, 2, 3, and 4.

* * * * *